US011149928B2

(12) United States Patent
Seong et al.

(10) Patent No.: US 11,149,928 B2
(45) Date of Patent: Oct. 19, 2021

(54) LAMP WITH CONNECTION TERMINAL AND COUPLING MEMBER FOR VEHICLE AND METHOD FOR ASSEMBLING THE SAME

(71) Applicant: SL Corporation, Daegu (KR)

(72) Inventors: Yeonhyeok Seong, Gyeongsan-si (KR);
Jaehyun Shin, Gyeongsan-si (KR);
Hyunjun Cho, Gyeongsan-si (KR);
Hwanyub Joo, Gyeongsan-si (KR);
Hwansung Choi, Gyeongsan-si (KR);
Minjoon Kim, Gyeongsan-si (KR)

(73) Assignee: SL Corporation, Daegu (KR)

(*) Notice: Subject to any disclaimer, the term of this patent is extended or adjusted under 35 U.S.C. 154(b) by 56 days.

(21) Appl. No.: 16/899,875

(22) Filed: Jun. 12, 2020

(65) Prior Publication Data

US 2021/0164640 A1  Jun. 3, 2021

(30) Foreign Application Priority Data

Dec. 2, 2019 (KR) .................. 10-2019-0157956
Mar. 27, 2020 (KR) .................. 10-2020-0037592

(51) Int. Cl.
*F21V 23/00* (2015.01)
*F21V 17/06* (2006.01)
(Continued)

(52) U.S. Cl.
CPC .......... *F21V 23/001* (2013.01); *B60Q 1/0088* (2013.01); *F21S 41/151* (2018.01);
(Continued)

(58) Field of Classification Search
CPC .... B60Q 1/0088; F21S 41/192; F21S 43/195;
F21V 19/003; F21V 19/005;
(Continued)

(56) References Cited

U.S. PATENT DOCUMENTS

| 2014/0063805 A1* | 3/2014 | Song | F21S 41/192 |
| | | | 362/249.01 |
| 2014/0160783 A1* | 6/2014 | Lee | F21S 45/49 |
| | | | 362/540 |

(Continued)

FOREIGN PATENT DOCUMENTS

| EP | 2672535 A2 | 12/2013 |
| EP | 2781826 A1 | 9/2014 |

(Continued)

*Primary Examiner* — Keith G. Delahoussaye
(74) *Attorney, Agent, or Firm* — Nelson Mullins Riley & Scarborough LLP; Kongsik Kim, Esq.

(57) ABSTRACT

A vehicle lamp comprises a light irradiation unit including a light source and a board on which the light source is installed, a base member including a first surface for mounting the light irradiation unit and a second surface adjacent to the first surface, a connection terminal arranged on the second surface and extending and protruding in a direction of the first surface, and a coupling member arranged on the board and electrically connected with the light source. The connection terminal is inserted into the coupling member when the board is mounted on the first surface.

19 Claims, 32 Drawing Sheets

(51) Int. Cl.
  *F21V 17/10*    (2006.01)
  *F21V 23/06*    (2006.01)
  *F21S 41/151*    (2018.01)
  *F21S 41/25*    (2018.01)
  *F21S 43/20*    (2018.01)
  *F21S 45/47*    (2018.01)
  *F21S 41/19*    (2018.01)
  *F21S 43/19*    (2018.01)
  *F21S 43/14*    (2018.01)
  *B60Q 1/00*    (2006.01)
  *F21Y 115/10*    (2016.01)
  *F21Y 113/13*    (2016.01)
  *F21Y 107/50*    (2016.01)
  *F21Y 113/00*    (2016.01)
  *F21Y 113/10*    (2016.01)

(52) U.S. Cl.
  CPC ............ *F21S 41/192* (2018.01); *F21S 41/25* (2018.01); *F21S 43/14* (2018.01); *F21S 43/195* (2018.01); *F21S 43/20* (2018.01); *F21S 45/47* (2018.01); *F21V 17/06* (2013.01); *F21V 17/101* (2013.01); *F21V 23/06* (2013.01); *F21Y 2107/50* (2016.08); *F21Y 2113/00* (2013.01); *F21Y 2113/10* (2016.08); *F21Y 2113/13* (2016.08); *F21Y 2115/10* (2016.08); *H01R 2201/26* (2013.01)

(58) Field of Classification Search
  CPC .... F21V 19/006; F21V 23/06; F21Y 2107/50; F21Y 2115/00; F21Y 2115/10; F21Y 2115/13; H01R 2201/26
  See application file for complete search history.

(56) References Cited

U.S. PATENT DOCUMENTS

| | | | |
|---|---|---|---|
| 2014/0218954 | A1* | 8/2014 | Yoon ................... H05K 3/366 362/546 |
| 2015/0103539 | A1* | 4/2015 | Lee ...................... F21S 45/47 362/382 |
| 2017/0082257 | A1 | 3/2017 | Yoon |

FOREIGN PATENT DOCUMENTS

| | | |
|---|---|---|
| EP | 3517828 A1 | 7/2019 |
| FR | 3056679 A1 | 3/2018 |
| JP | 2014238981 A | 12/2014 |
| JP | 2018085300 A | 5/2018 |
| KR | 10-20090079292 A | 7/2009 |
| KR | 10-20120076197 A | 7/2012 |
| KR | 10-2014-0009559 A | 1/2014 |
| KR | 10-20140100325 A | 8/2014 |
| KR | 10-20140126372 A | 10/2014 |

\* cited by examiner

Related Art

LAMP WITH CONNECTION TERMINAL AND COUPLING MEMBER FOR VEHICLE AND METHOD FOR ASSEMBLING THE SAME

CROSS-REFERENCE TO RELATED APPLICATION

This application claims the benefit of priority from Korean Patent Application Nos. 10-2019-0157956 filed on Dec. 2, 2019 and 10-2020-0037592 filed on Mar. 27, 2020, the contents of which in their entirety are herein incorporated by reference.

BACKGROUND

1. Technical Field

The present disclosure relates to a vehicle lamp, and more specifically, to a vehicle lamp and a method for assembling the same capable of simplifying and miniaturizing the overall structure and simplifying the assembly process.

2. Description of the Related Art

Generally, a vehicle has various types of lamps. The vehicle lamp has an illumination function for checking objects near the vehicle in the low-light conditions (e.g., nighttime driving), and a signal function to notify other vehicles or road users of the vehicle's driving status. For example, headlights and fog lights are intended for illumination purposes, and direction indicating lights (turn signals), fog lights, brake lights, or side markers are intended for signaling purposes.

In the past, a light source such as a halogen bulb or a high intensity discharge (HID) lamp was mainly used as the vehicle lamp. However, recently, a light emitting diode (LED) is mainly used as the light source. Since the LED has a color temperature of about 5500K, which is close to sunlight, the LED light source minimizes human eye fatigue. Further, it not only increases the freedom of design of the lamp by minimizing its size, but also provides economic advantages due to its semi-permanent life.

As such, attempts have been made to overcome an increase of processing and assembly steps in the conventional, complicated lamp structure by introducing the LED to the vehicle. Further, research has been conducted to reduce the overall installation size and improve the space utilization of the lamp while attempting to extend a life of the lamp due to the characteristics of the LED itself.

The vehicle lamp using the LED as the light source mounts a board on which the LED is mounted so as to correspond to a light irradiation direction. Since the performance drop is greater because of the temperature rise due to the characteristics of the LED, a heat sink for dissipating heat generated from the LED to the outside is additionally provided. It is common for such a board and a heat sink to be mutually coupled via a coupling means such as bolts.

However, a related configuration must be added to couple the members such as the board or the heat sink via various coupling means. Moreover, an assembly process including such a coupling process is additionally required. In addition, an LED-mounted board and a device provided outside the vehicle lamp must be electrically connected. Therefore, various electrical components such as a wiring, terminals, or connectors should be additionally arranged and interconnected near the board and the heat sink.

As such, the vehicle lamp must be added with basic elements for the vehicle lamp, as well as the coupling means between each member or electrical components for connecting from each member to an external device. Therefore, the overall structure becomes larger and more complex, and the assembly process is increased.

FIG. 1 shows a connection manner of a connector in a conventional vehicle lamp of the related art. As shown in FIG. 1, the conventional vehicle lamp uses a structure in which a male connector 2 connected to a plurality of male terminals 1 and a female connector 3 connected to a plurality of female terminals 4 are linearly coupled.

Due to such a coupling structure, board miniaturization and slim design application are limited, the connector fastening is burdensome in the vehicle lamp, and the number of assembly steps increases. Further, there is also a concern for the quality problem (unfastened, incompletely fastened, or incorrectly fastened) due to manual assembly of multiple connectors. In addition, degradation of the assembly of the lamp due to wiring interference and quality problems associated with the wire may also occur.

Accordingly, there is a need for a method to simplify and/or miniaturize the configuration of the vehicle lamp using the LED as the light source and to simplify the overall assembly process.

SUMMARY

Aspects of the present disclosure provide a vehicle lamp in which a conventional cable-to-cable connection manner of the related art is improved, a pin block capable of mass production is first assembled on a heat sink, and subsequently a board is mounted on the heat sink, thereby completing electrical wiring. Aspects of the present disclosure may also reduce a space for electrical wiring to improve the design freedom of the vehicle lamp. Aspects of the present disclosure may also reduce the production time and cost of the vehicle lamp by reducing internal wiring that causes complexity in a wiring structure included in the pin block. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may comprise a light irradiation unit including a light source and a board on which the light source is installed; a base member including a first surface for mounting the light irradiation unit and a second surface adjacent to the first surface; a connection terminal arranged on the second surface and extending and protruding in a direction of the first surface; and a coupling member arranged on the board and electrically connected with the light source. The connection terminal may be inserted into the coupling member when the board is mounted on the first surface.

In some embodiments, the coupling member may include an aperture that penetrates through the board and a solder that fixedly couples the aperture and the connection terminal that is inserted into the aperture. In some embodiments, the coupling member may include a connector arranged on the board while forming a predetermined angle with a direction in which the connection terminal protrudes, and the connector may include a connection port formed to be opened in a rear direction of the board to allow the connection terminal to be inserted thereinto when the board is mounted on the first surface.

A plurality of light irradiation units may be provided, each having the light source and the board, and the connection terminal may include a plurality of connection terminal groups corresponding to the plurality of light irradiation units. The vehicle lamp may further include a pin block that accommodates the plurality of connection terminal groups and mounted on the second surface of the base member, and at least a portion of each of the plurality of connection terminal groups may extend and protrude from the pin block toward the first surface of the base member.

The pin block may include the plurality of connection terminal groups; a body accommodating a connection that extends from the connection terminal groups; and a connection socket formed on one side of the body and electrically connected to the connection. The first surface may comprise a plurality of mounting surfaces corresponding to the plurality of connection terminal groups, the plurality of mounting surfaces may have steps between adjacent mounting surfaces, and the plurality of light irradiation units may be mounted on the plurality of mounting surfaces. A height of each of the plurality of connection terminal groups may be determined depending on a corresponding mounting surface among the plurality of mounting surfaces. At least two of the steps may have different heights from each other.

According to another aspect of the present disclosure, a method for assembling a vehicle lamp may include providing a base member including a first surface and a second surface adjacent to the first surface; and mounting a pin block on the second surface. The pin block may accommodate a plurality of connection terminal groups, and at least a portion of each of the plurality of connection terminal groups may extend and protrude outwardly. The method may also include mounting a plurality of boards to the first surface of the base member, each of the plurality of boards including a light source and a coupling member that is electrically connected to the light source; and mounting the plurality of boards on the first surface of the base member and simultaneously inserting a corresponding connection terminal group among the plurality of connection terminal groups into the coupling member. In particular, each of the plurality of connection terminal groups may extend and protrude from the pin block in a direction of the first surface.

The coupling member may comprise an aperture that penetrates through the board, and the corresponding connection terminal group among the plurality of connection terminal groups may be inserted into the aperture, and a solder may be formed between the corresponding connection terminal group and the aperture. The method may further comprise mounting a lens that transmits light emitted from the light source and a housing that accommodates the lens to each of the plurality of boards. The first surface may comprise a plurality of mounting surfaces corresponding to the plurality of connection terminal groups, the plurality of mounting surfaces may have steps between adjacent mounting surfaces, and the plurality of light irradiation units may be mounted on the plurality of mounting surfaces.

According to yet another aspect of the present disclosure, a vehicle lamp may include a plurality of light irradiation units including a light source and a board on which the light source is installed; a base member for mounting the plurality of light irradiation units; a pin block including a connection socket and a plurality of wirings, a first end of the plurality of wirings being connected to the plurality of light irradiation units and a second end of the plurality of wirings being connected to the connection socket, and the pin block arranged on one side of the base member; and a plug including a cable connecting the connection socket to an external device and a return wiring for electrically connecting at least one pair of wirings among the plurality of wirings to each other, the plug being detachably coupled with the connection socket. In particular, the one pair of wirings may be electrically disconnected when the plug is disconnected from the connection socket, and may be electrically connected through the return wiring when the plug is coupled to the connection socket.

The plurality of light irradiation units may comprise a first light irradiation unit having a first function, and a second light irradiation unit having a second function different from the first function. The plurality of wirings may comprise a first wiring array arranged on a first layer of the pin block, and a second wiring array arranged on a second layer of the pin block different from the first layer. The first light irradiation unit may be connected to the first wiring array, and the second light irradiation unit may be connected to the second wiring array. The first light irradiation unit and the second light irradiation unit may be connected together to either of the first wiring array and the second wiring array. The first light irradiation unit and the second light irradiation unit may be mounted to the base member adjacent to each other.

The first light irradiation unit may irradiate a headlight, and the second light irradiation unit may irradiate at least one of a daytime running light (DRL), a position light, or a turn signal. The at least one pair of wirings connected by the return wiring may be arranged in the same layer of the pin block. Alternatively, the at least one pair of wirings connected by the return wiring may be arranged across different layers of the pin block.

One of the at least one pair of wirings connected by the return wiring may be connected to a terminal formed in a first position of one light irradiation unit among the plurality of light irradiation units, and to a terminal formed in a second position of another light irradiation unit having a same function as the one light irradiation unit among the plurality of light irradiation units. The terminal formed in the first position may be a negative terminal that supplies power for the function, and the terminal formed in the second position may be a positive terminal that supplies power for the function. The pin block may further include an internal wiring that internally connects two light irradiation units among the plurality of light irradiation units without extension to the connection socket.

According to the vehicle lamp in accordance with the present disclosure, the electrical wiring may be completed by mounting the pin block and the board in place on the heat sink without additional electrical wiring. Therefore, the overall assembly process may be simplified, and the assembly time may be reduced. In particular, a height of a connector may be significantly reduced, requiring a thinner connecting space. Therefore, the compactness of the vehicle lamp and the freedom of design may be secured together. In addition, due to the reduction of internal wiring in the pin block, the burden of a terminal connection process and the need for additional mold manufacturing may be reduced.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
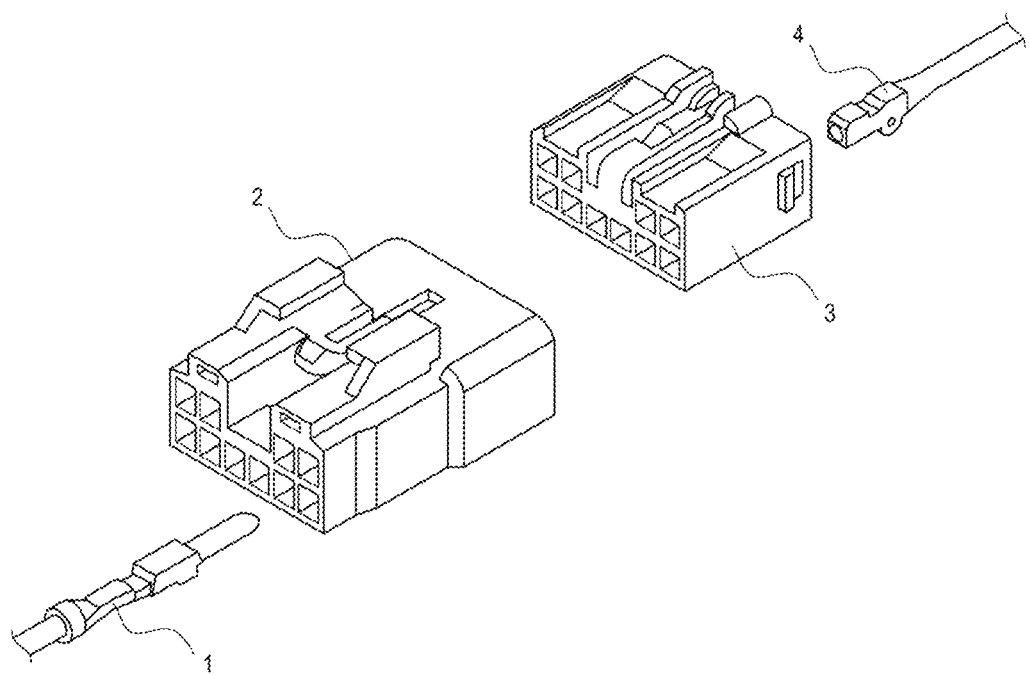
FIG. 1 is a view showing a connection manner of a connector in a conventional vehicle lamp of the related art.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 2:
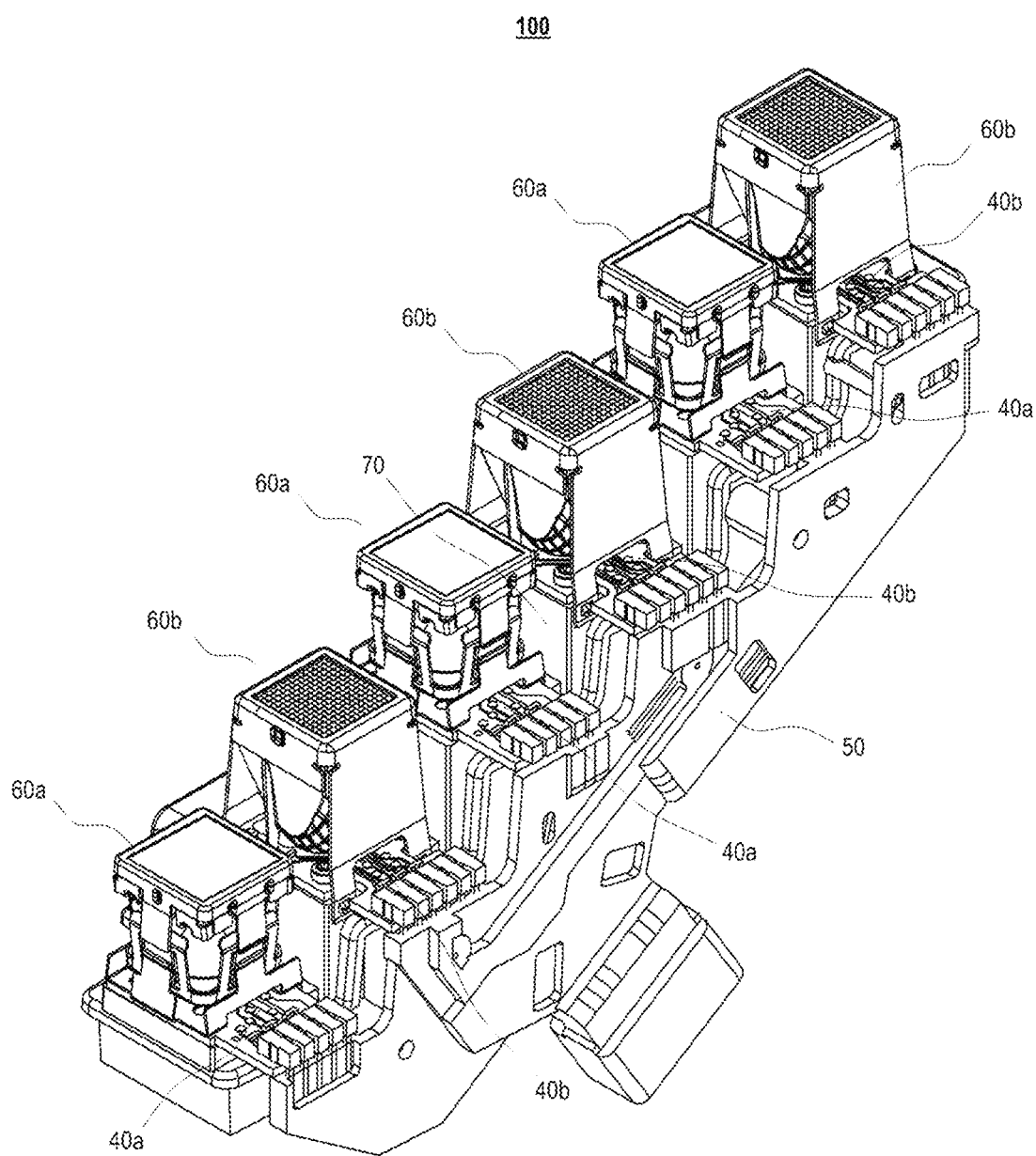
FIG. 2 is a perspective view showing a vehicle lamp according to an exemplary embodiment of the present disclosure.
Figure 3:
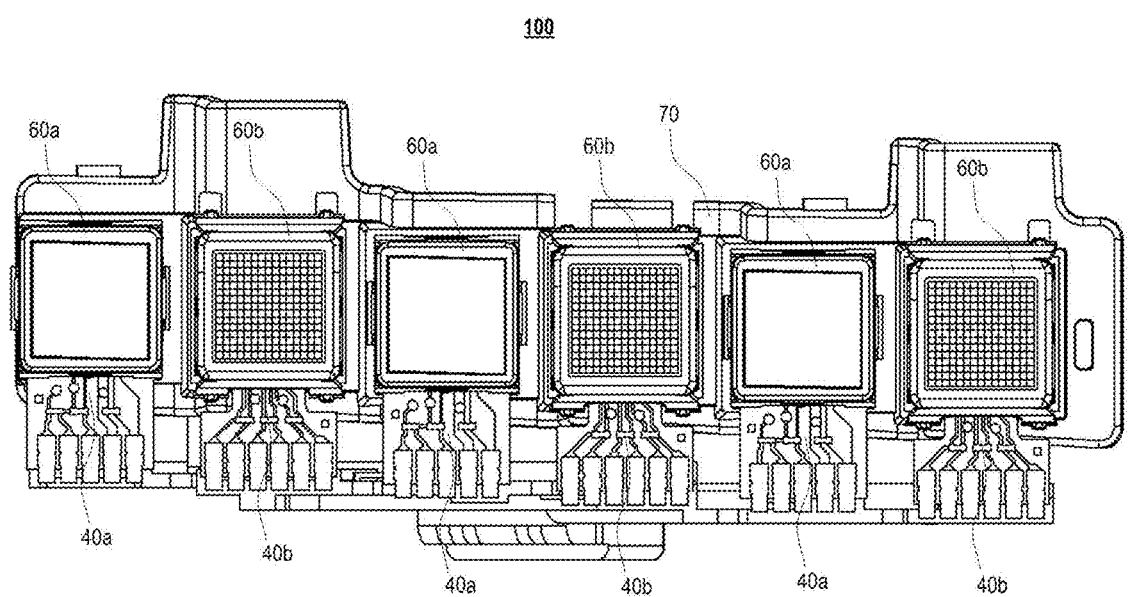
FIG. 3 is a plan view showing the vehicle lamp according to the exemplary embodiment of the present disclosure.

FIG. 2 is a perspective view showing a vehicle lamp 100 according to an exemplary embodiment of the present disclosure. FIG. 3 is a plan view showing the vehicle lamp 100. The vehicle lamp 100 may include a base member 70 having a mounting surface, at least one light irradiation unit 60a and 60b mounted on the mounting surface of the base member 70, and a pin block 50 installed on an adjacent side surface while forming a predetermined angle with the mounting surface. Although omitted in FIG. 2, the vehicle lamp 100 may further include a bezel that covers a portion of the light irradiation units 60a and 60b except for a light emission surface. Such a bezel may be provided individually or integrally for a plurality of light irradiation units 60a and 60b.

The base member 70 may serve as a support for installing various other members, and may also have a function of a heat sink that dissipates heat generated from a light source installed in the light irradiation units 60a and 60b to the outside. In this case, the base member 70 may be made of a material having high thermal conductivity, for example, a metal such as aluminum or a thermally conductive plastic.

In the vehicle lamp 100, the light irradiation units 60a and 60b may be mounted on the mounting surface (first surface) of the base member 70, and the pin block 50 may be installed on a side surface (second surface) adjacent to the first surface. Boards 40a and 40b included in the light irradiation units 60a and 60b may include a light source, and may be fixed to the mounting surface by a coupling means such as bolts. Accordingly, the boards 40a and 40b and the pin block 50 may be arranged at the same angle (e.g., 90°) as an angle formed by the mounting surface and the side surface of the base member 70.

The light irradiation units 60a and 60b may include a plurality of light irradiation units, and may include different types of light irradiation units. The different types of light irradiation units may be controlled to be turned on or off synchronously (e.g., collectively) or asynchronously (e.g., individually). In the exemplary embodiment, the first light irradiation unit 60a may be a lighting module for an illumination function, and the second light irradiation unit 60b may be a signal module. When the light irradiation units 60a and 60b include the plurality of light irradiation units, the base member 70 may include a plurality of mounting surfaces formed in a stepwise manner to mount the plurality of light irradiation units, as shown in FIG. 2.

In the detailed description of the present disclosure, the light irradiation units 60a and 60b may include two types and include a total of six light irradiation units. However, the present disclosure is not limited thereto, and the number and type of light irradiation units may vary depending on the design purpose.

Figure 4A:
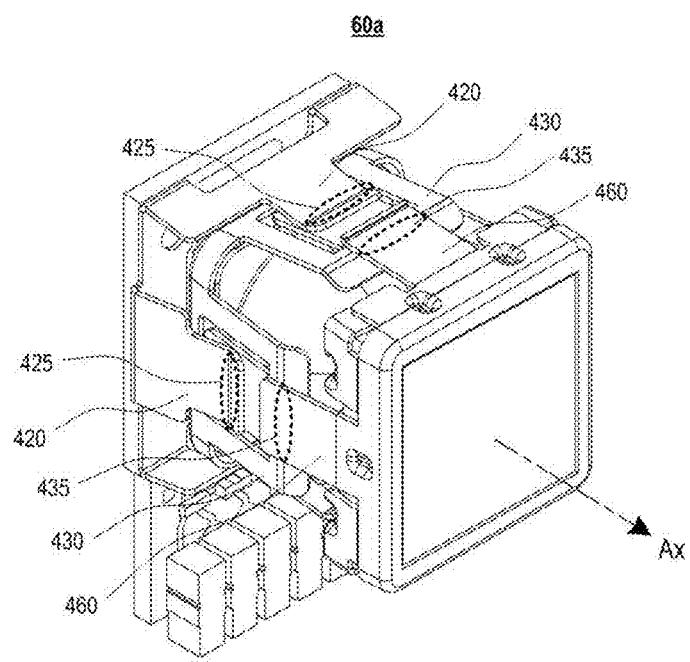
FIGS. 4A and 4B are perspective and exploded perspective views of a first light irradiation unit according to the exemplary embodiment of the present disclosure.
Figure 4B:
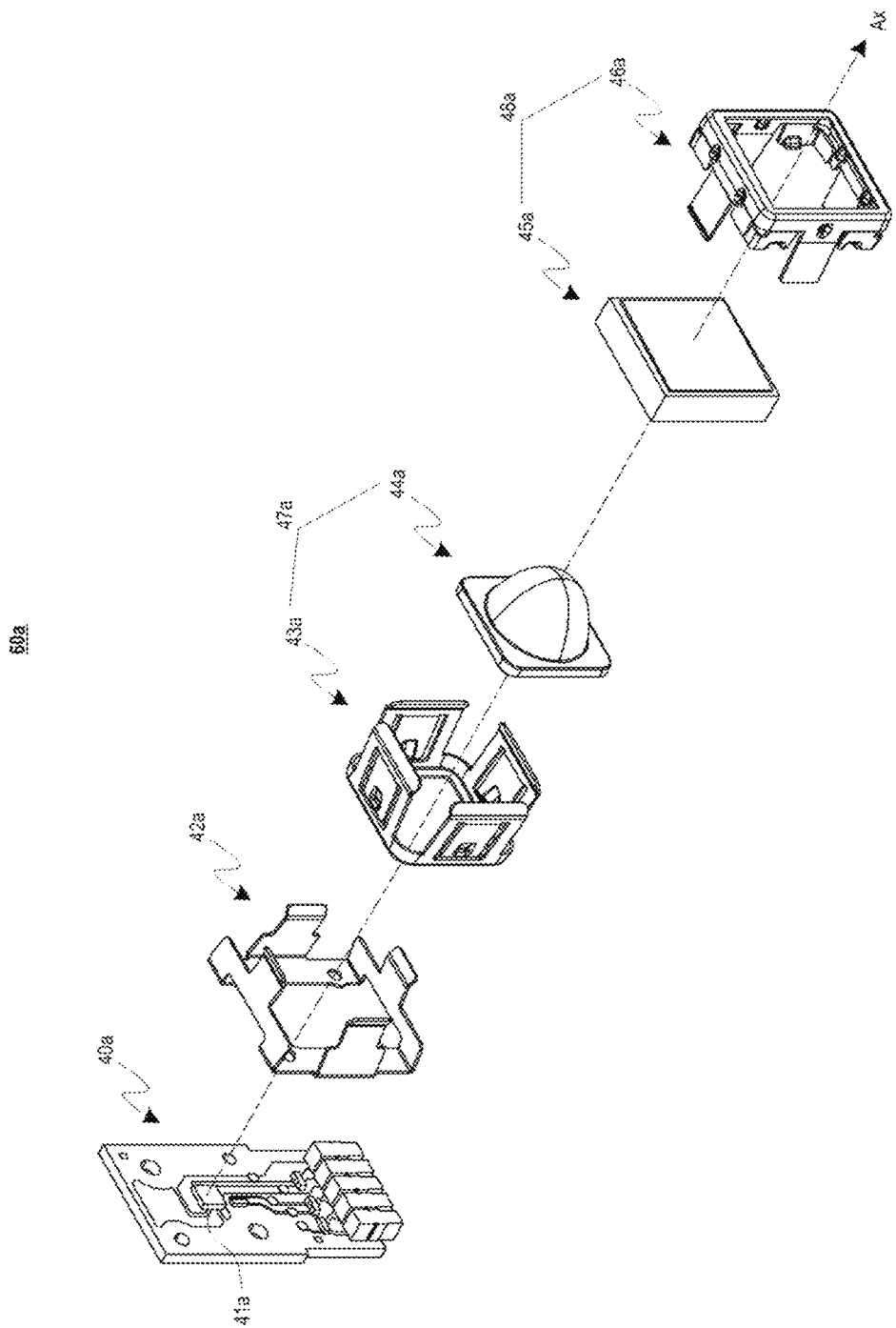
Figure 5A:
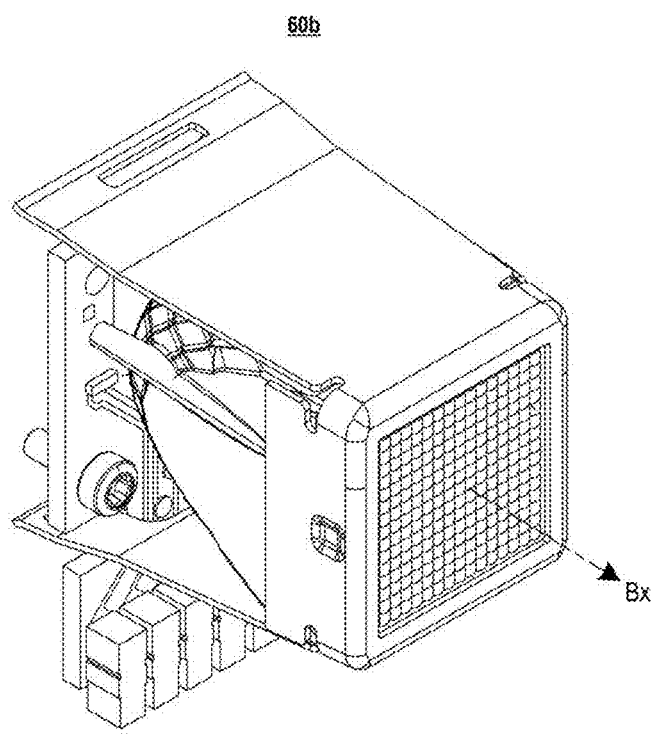
FIGS. 5A and 5B are perspective and exploded perspective views of a second light irradiation unit according to the exemplary embodiment of the present disclosure.
Figure 5B:
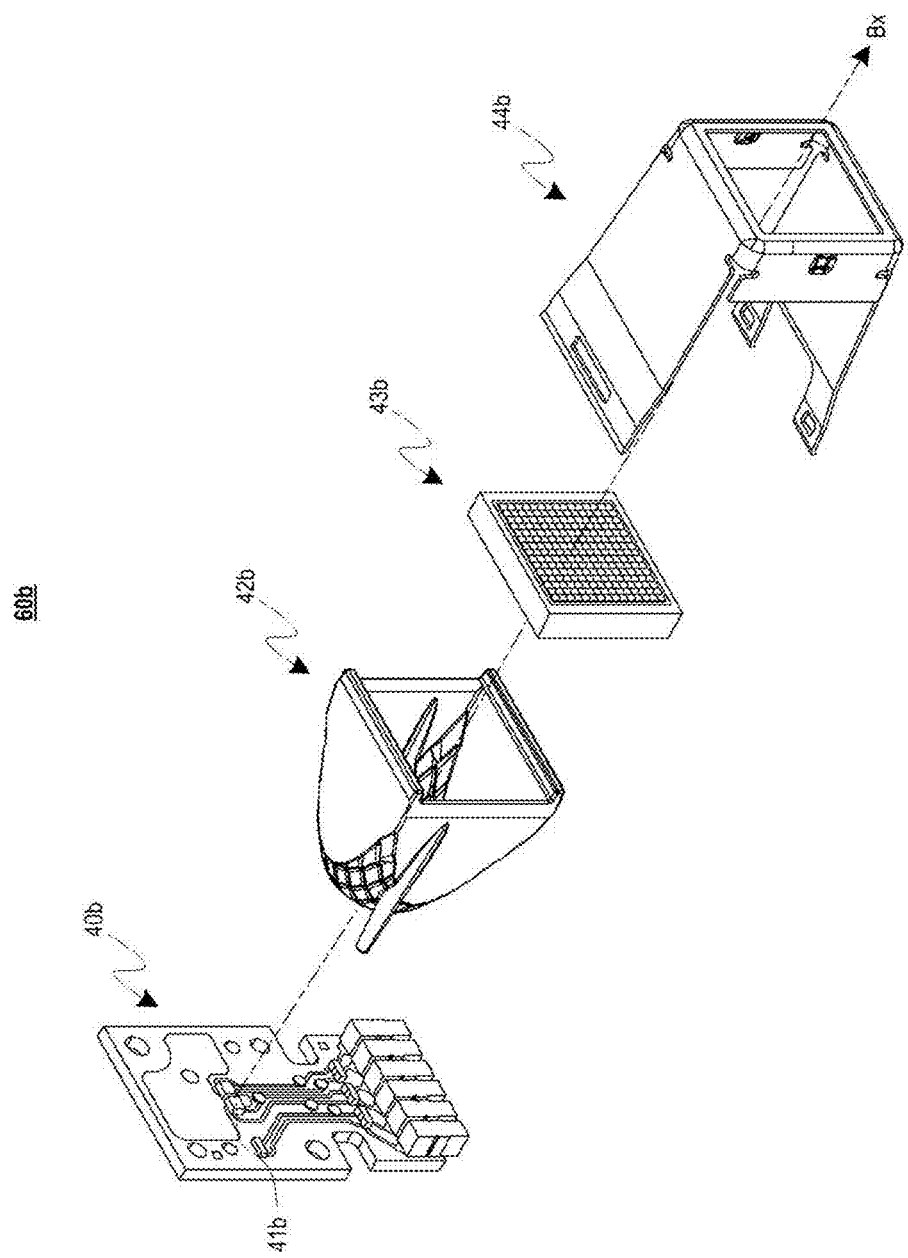

FIGS. 4A and 4B are perspective and exploded perspective views of the first light irradiation unit 60a according to the exemplary embodiment of the present disclosure, and FIGS. 5A and 5B are perspective and exploded perspective views of the second light irradiation unit 60b according to the exemplary embodiment of the present disclosure. For example, the first light irradiation unit 60a may be a lighting module having a micro lens array (MLA), and the second light irradiation unit 60b may be a signaling module such as a turn signal or an emergency light.

Referring to FIGS. 4A and 4B, the first light irradiation unit 60a may include a plurality of members aligned along an optical axis Ax. The first light irradiation unit 60a may include a structure in which a board (PCB) bracket 42a, a lens bracket 43a, a collimation lens 44a, an MLA lens 45a, and an MLA bracket 46a are arranged and assembled on the board 40a in the order shown. Light emitted from the light source 41a may be converted to approximately parallel light while passing through the collimation lens 44a. The converted light may pass through the MLA unit 45a and be emitted as light having improved uniformity. Here, a lens assembly 47a may be configured in advance through pre-assembly of the lens bracket 43a and the collimation lens 44a. Further, an MLA assembly 48a may be configured in advance through pre-assembly of the MLA lens 45a and the MLA bracket 46a.

An active alignment process may be applied between the PCB bracket 42a and the lens bracket 43a, and/or between the lens bracket 43a and the MLA bracket 46a to accurately align a direction in which light is emitted during this assembly process.

Figure 4C:
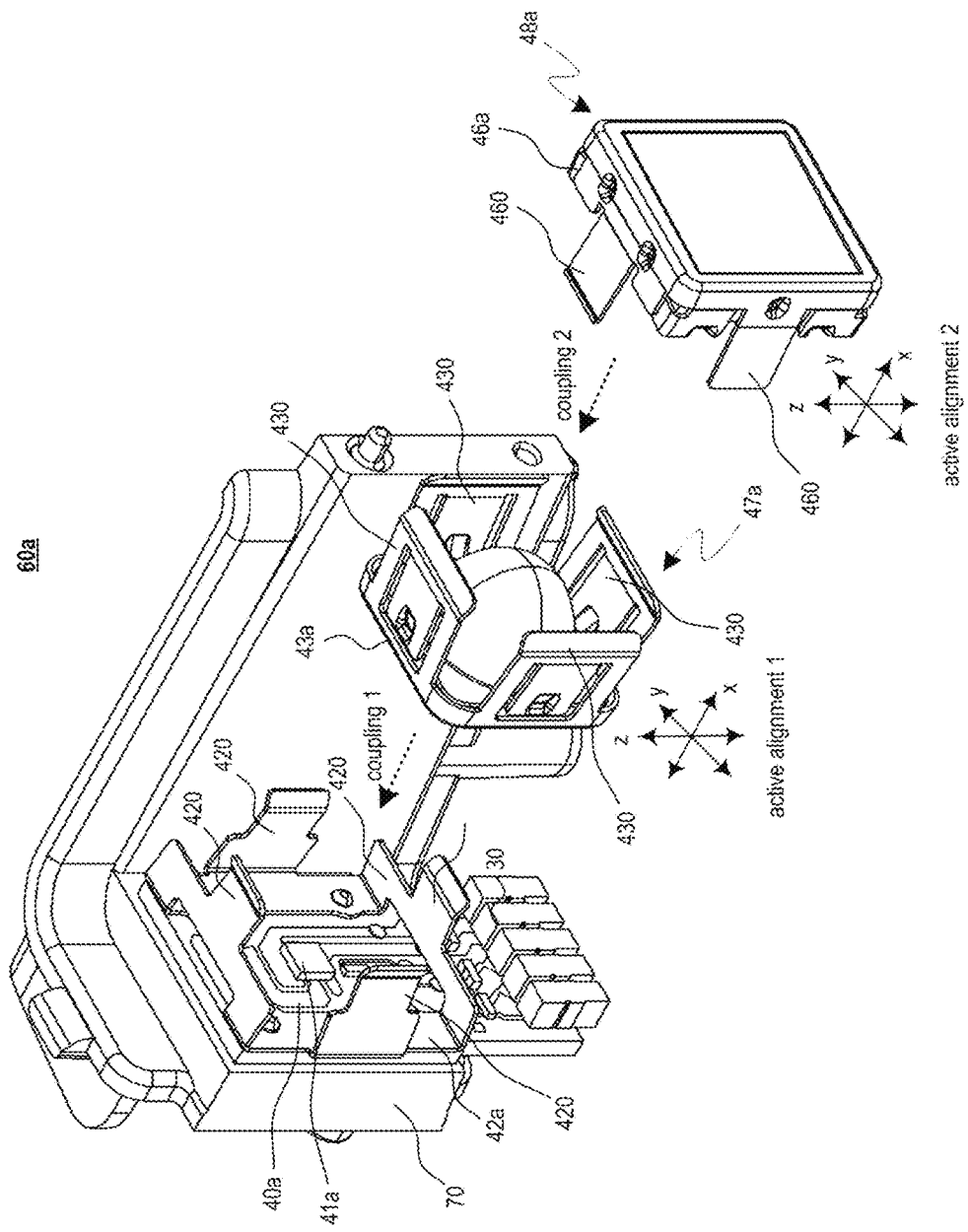
FIG. 4C is a perspective view showing two times active alignment processes applied to the first light irradiation unit.

FIG. 4C is a view showing an overall active alignment process applied to the first light irradiation unit 60a. As described above, when the lens assembly 47a is coupled to the PCB bracket 42a that secures the board 40a to a seating 71 (shown in FIG. 6) of the base member 70, a primary active alignment may be applied. When the MLA assembly 48a is coupled to the lens bracket 43a of the lens assembly 47a, a secondary active alignment may be performed once again.

Alternatively, one of the two active alignments may be omitted. For example, when the lens assembly 47a is coupled to the PCB bracket 42a, it may be coupled without the active alignment, and the active alignment may applied only when the MLA assembly 48a is coupled to the lens bracket 43a of the lens assembly 47a. On the other hand, the active alignment may also be applied only when the lens assembly 47a is coupled to the PCB bracket 42a.

For the active alignment, the PCB brackets 42a, the lens brackets 43a, and the MLA brackets 46a may be formed with flaps 420, 430, and 460 that extend from each edge in a direction of the optical axis Ax or in an opposite direction of the optical axis Ax. Specifically, the PCB bracket 42a may include a first flap 420 that extends toward the optical axis Ax. The lens bracket 43a may include a second flap 430 that extends toward the optical axis Ax. The MLA bracket 46a may include a third flap 460 that extends toward the opposite direction of the optical axis Ax.

First, when the lens assembly 47a is coupled to the PCB bracket 42a (Coupling 1), the first flap 420 may overlap to surround the second flap 430. In particular, a desired intermediate light distribution pattern may be obtained by turning on the light source 41a and adjusting a light distribution pattern formed on a screen while moving the lens bracket 43a by a jig at three degrees of freedom (x, y, and z axes). When the desired intermediate light distribution pattern is obtained, a first weld for permanently fixing the first flap 420 and the second flap 430 may be formed at a first overlapped region 425 of the first flap 420 and the second flap 430 (see FIGS. 4A and 4D).

Subsequently, when the MLA assembly 48a is coupled to the lens bracket 43a (Coupling 2), the third flap 460 may overlap to surround the second flap 430. In particular, the desired light distribution pattern may be also obtained by turning on the light source 41a and adjusting the light distribution pattern formed on the screen while moving the MLA bracket 46a at three degrees of freedom. When the desired final light distribution pattern is obtained, a second weld for permanently fixing the second flap 430 and the third flap 460 may be formed at a second overlapped region 435 between the second flap 430 and the third flap 460 (see FIGS. 4A and 4D). Such first and second welds may be formed by laser welding.

Figure 4D:
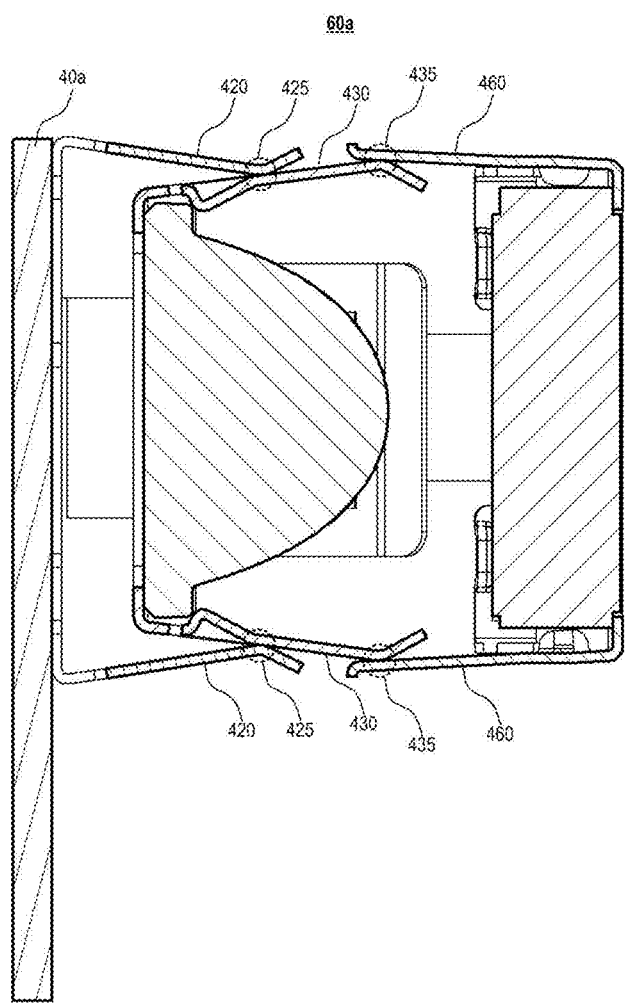
FIG. 4D is a cross-sectional view of the first light irradiation unit of FIG. 4C cut in the longitudinal direction.

FIG. 4D is a longitudinal cross-sectional view of the first light irradiation unit 60a of FIG. 4C cut in a vertical direction (a direction parallel to an x-z plane). Referring to FIG. 4D, the first weld may be formed in the overlapped region 425 between the first flap 420 of the PCB bracket 42a and the second flap 430 of the lens bracket 43a, and the second weld may be formed in the second overlapped region 435 between the third flap 460 of the MLA bracket 46a and the second flap 430 of the lens bracket 43a. Therefore, the first weld may be disposed closer to the board 40a than the second weld.

Referring to FIGS. 5A and 5B, the second light irradiation unit 60b may include a plurality of members aligned along an optical axis Bx. The second light irradiation unit 60b may include a structure in which a reflector 42b, an inner lens 43b, and a housing 44b are arranged and assembled on the board 40b in the order shown. Light emitted from a light source 41b may be reflected from an inner surface of the reflector 42b and directed forward, and the reflected light may be emitted to the outside while passing through the inner lens 43b. The housing 44b may be coupled to the base member 70 while accommodating the board 40b, the reflector 42b, and the inner lens 43b.

Figure 6:
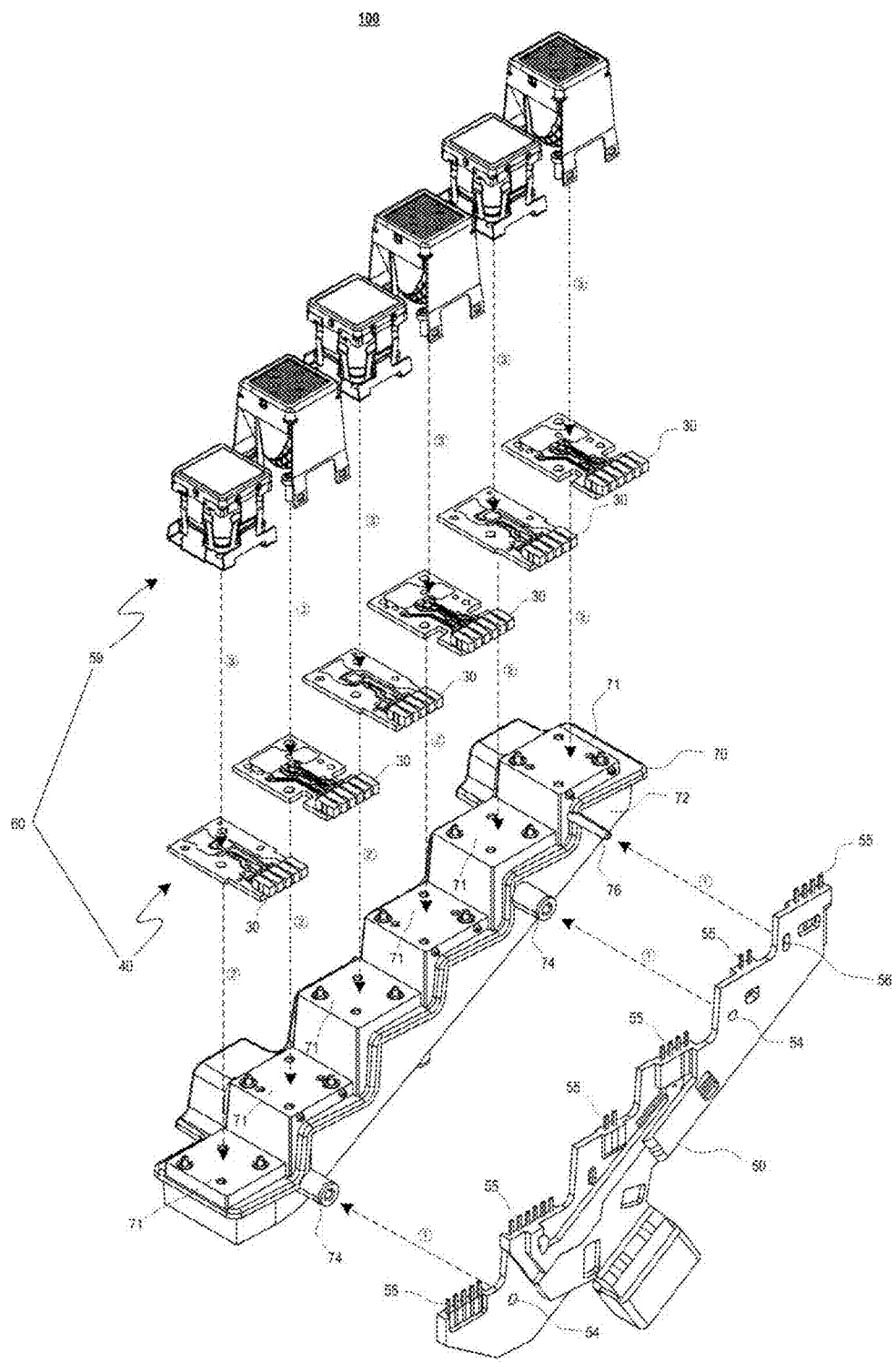
FIG. 6 is a view showing a process of assembling the vehicle lamp of FIG. 2 according to the exemplary embodiment of the present disclosure.

FIG. 6 is a view showing a process of assembling the vehicle lamp 100 of FIG. 2. First, the base member 70 may be prepared, in which the base member 70 include the mounting surface (first surface) 71 and the side surface 72 adjacent to the mounting surface 71 while forming a predetermined angle (e.g., 90°) with the mounting surface 71. A fastening groove may be formed on the mounting surface 71 and the side surface 72 to enable fastening by a fastening means such as a bolt or a screw.

Subsequently, the pin block 50, which accommodates the connection terminal 55, and from which at least a part of the connection terminal 55 extends outwardly, may be mounted on the side surface 72 (①). The connection terminal 55 may protrude from the pin block in a predetermined direction. For example, the predetermined direction is indicated as an upward direction in FIG. 6, but the absolute direction of the predetermined direction may vary depending on the orientation of the vehicle lamp 100. Therefore, it may be defined as a direction from the side surface 72 of the base member 70 toward the mounting surface 71 to a front direction of the board 40.

In this process, a fastening aperture 54 formed in the pin block 50 and a fastening groove 74 formed in the side surface 72 of the base member 70 may be arranged to match, and the pin block 50 may be fixed by inserting the fastening means such as the bolt or screw therein.

Further, a guide protrusion 76 may be formed on the side surface 72 of the base member 70, and a guide aperture 56 may be formed on the pin block 50 to allow the fastening aperture 54 and the fastening groove 74 may be matched more easily. By inserting the guide protrusion 76 into the guide aperture 56 of the pin block 50, the pin block 50 may be arranged at a predetermined position of the base member 70.

Subsequently, the board 40 including a light source and a connector 30 electrically connected to the light source may be mounted on the mounting surface 71 (②). In particular, since a rear surface of the board 40 is in close contact with the base member 70, heat generated from the light source may be transferred to the base member 70 and dissipated to the outside. In this step, the board 40 may be fixed to the mounting surface 71 by the fastening means, such as the bolt or screw.

According to the present disclosure, when the board 40 is mounted on the mounting surface 71 as described above, the connection terminal 55 of the pin block 50 may be simultaneously coupled to the connector 30 formed on the board 40. Therefore, in addition to mounting the board 40 to the base member 70, a separate configuration or process for coupling the connector 30 and the connection terminal 55 may be omitted.

Finally, among the light irradiation units 60a, 60b, an optical member 59 other than the board 40, for example, an optical lens, a reflector, a bracket, or a housing may be assembled on the board 40 mounted on the base member 70 (③). Through these processes, each component may be assembled as the vehicle lamp 100 as shown in FIG. 2. A bezel or an outer housing may be additionally assembled for the vehicle lamp 100 of FIG. 2.

According to the exemplary embodiment of the present disclosure, a plurality of light irradiation units 60 may be included, and each of the plurality of light irradiation units 60 may include the board 40 including a light source and the optical member 59. Therefore, the connection terminal 55 may also include a plurality of groups of connection terminals 55 corresponding to the number of the plurality of light irradiation units 60. The present disclosure also includes a configuration in which only one of the light irradiation units 60 and one of the connection terminal group 55 is used. However, using a plurality of light irradiation units 60 and a plurality of connection terminal groups 55 with respect to one base member 70 may be more advantageous in simplifying the configuration and assembly process, and reducing the assembly cost.

In this case, a single pin block 50 may accommodate the plurality of groups of connection terminals 55, and the pin block 50 may be mounted on the second surface 72, and thus, each of the plurality of groups of connection terminals 55 may protrude from the pin block 50 toward a corresponding mounting surface among the plurality of mounting surfaces 71.

In addition, the plurality of mounting surfaces 71 may include steps between neighboring mounting surfaces, and each of the plurality of light irradiation units 60 may be mounted on the plurality of mounting surfaces 71. Therefore, the corresponding connector group 55 among the connection terminals may be coupled to the connector 30 formed on the board 40 included in each of the plurality of light irradiation units 60. Therefore, it may be understood that a height of each of the plurality of connection terminal groups 55 is determined depending on a corresponding mounting surface among the plurality of mounting surfaces 71.

In addition, referring to FIG. 6, dimensions (e.g., heights) of the steps between the plurality of adjacent mounting surfaces 71 may be different from each other (e.g., the height of the steps may increase as it goes from top to bottom). Forming the dimensions of the steps differently, for example to diminish or increase, may arise from the consideration that a shape near a corner of a front or rear end of the vehicle and the design characteristics that an assembly line of the vehicle lamp 100 installed therein may include a curvature.

Referring to FIG. 3, not only may a position of the light irradiation units 60a and 60b be recessed farther as they go toward the left, but also a shift difference (the height of the step) between adjacent light irradiation units 60a and 60b may become greater as they to the left. Therefore, the vehicle lamp 100 shown in FIG. 3 may be applied on a right side (e.g., a passenger side) when mounted on the front end of the vehicle, and may be applied on a left side (e.g., a driver side) when mounted on the rear end of the vehicle.

In FIG. 6, the heights of the steps between a plurality of adjacent mounting surfaces 71 are illustrated to be increasing monotonically. However, the present disclosure is not limited thereto, and the heights of the steps may vary depending on the design of the vehicle and/or a mounting location of the vehicle lamp 100 with respect to the vehicle. For example, a step of the same height may be formed between some of the plurality of adjacent mounting surfaces 71, and a step of different height may be formed between some of the plurality of adjacent mounting surfaces 71.

Figure 7A:
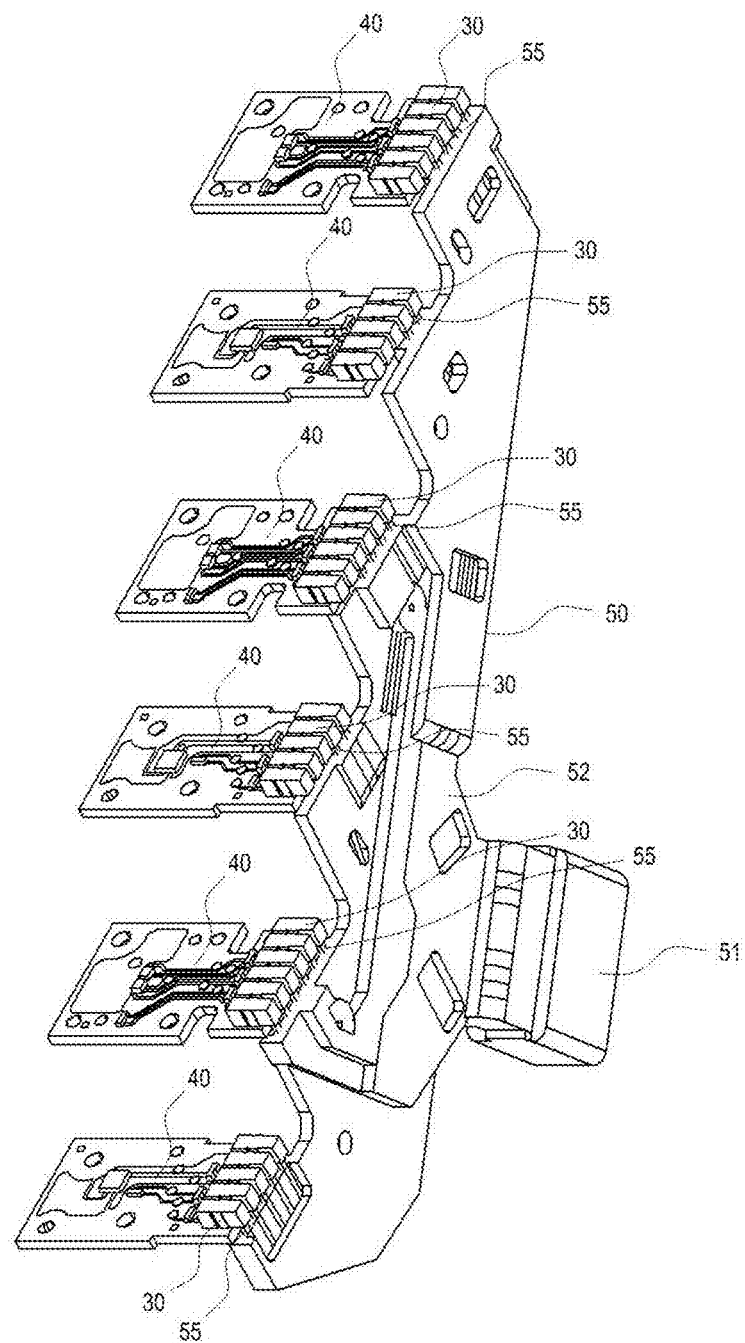
FIG. 7A is a perspective view showing a state in which a connector of a board and a connection terminal of a pin block in a board mounting step of FIG. 6 according to the exemplary embodiment of the present disclosure.
Figure 7B:
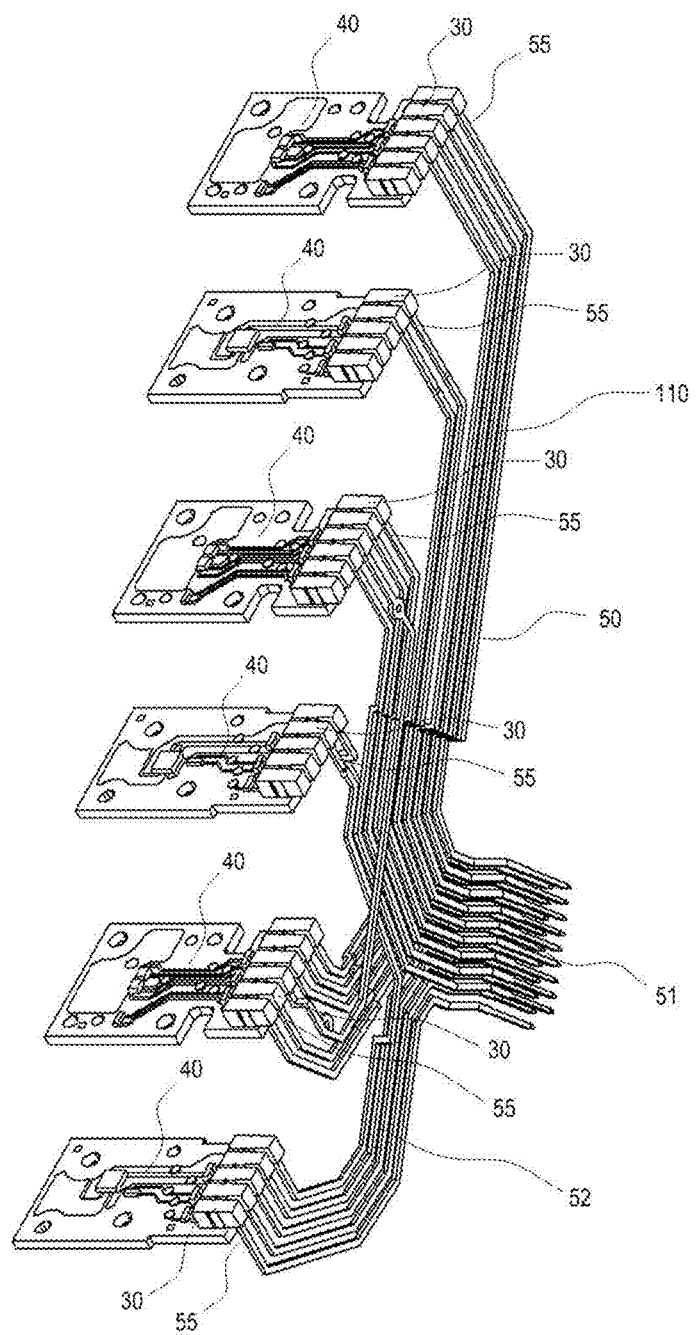
FIG. 7B is a perspective view showing an arrangement of an internal wiring in FIG. 7A according to the exemplary embodiment of the present disclosure.

FIGS. 7A and 7B are perspective views illustrating a state in which the connector 30 of the board 40 is coupled to the corresponding connection terminal 55 of the pin block 50 in the step of mounting the board in FIG. 6. The connector 30 may be an electric component for supplying power to a light source and input/output a signal to and from a control module for controlling the light source or other components on the board. According to the present disclosure, the connector 30 and the corresponding connection terminal 55 may be automatically coupled at a predetermined angle in the step of mounting the board. The predetermined angle may be 90°, but may be slightly less or greater than 90° depending on an angle formed by the mounting surface 71 and the side surface 72 of the base member 70.

When the connector 30 and the connection terminal 55 are coupled, the board 40 may be electrically connected to a connection socket 51 formed on one side of a body 52 through wiring 110 arranged in the body 52 of the pin block 50. As a result, the connection socket 51 may be electrically connected to the board 40 using the connection terminal 55 and the connector 30, so that when an external device (not shown) is connected to the connection socket 51, electrical connection between the external device and the board 40 is established.

Referring to FIG. 7B showing an example of the internal wiring 110 accommodated in the pin block 50, when the connector 30 formed on each board 40 is coupled to the connection terminal 55, the connection socket 51 may be electrically connected to the board 40 through the internal wiring 110. In particular, when the connection terminal 55 includes the plurality of connection terminal groups 55, each connection terminal group 55 may be connected to the connection socket 51 through the internal wiring 110.

FIG. 7B illustrates a structure in which the internal wiring is connected in series or in parallel for each board 40 (shown with a cover of the pin block 50 removed). However, the wiring may be configured differently when two types of different light irradiation units are included as shown in FIG. 2. In other words, separate wiring may be provided for different types, and only the boards of the light irradiation units belonging to the same type may be connected in parallel. Accordingly, each type of light irradiation units may be operated independently.

The pin block 50 described above may be mass-produced by injection using a mold in the form of accommodating both the plurality of connection terminals 55 and the internal wiring 110 and even providing the connection socket 51. Therefore, compared to the related art in which a number of wirings are formed and connected by cables individually, the structure and process may be simplified, and electrical connection problems such as disconnection or shorting may also be eliminated or reduced.

Figure 8:
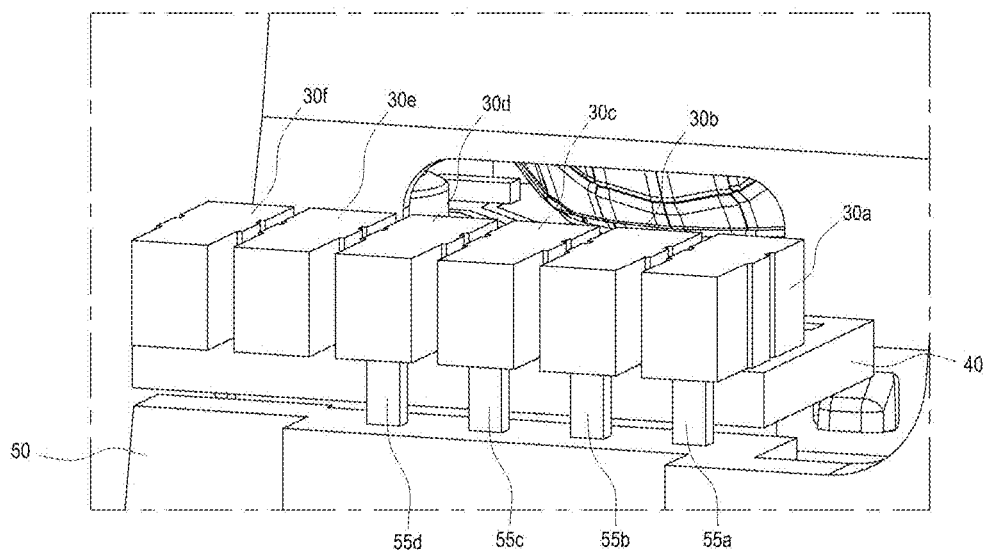
FIG. 8 is an enlarged perspective view showing the connector and the connection terminal according to the exemplary embodiment of the present disclosure.

FIG. 8 is an enlarged perspective view showing the connector 30 (30a to 30f) and the connection terminal 55 (55a to 55d). As shown in an example of FIG. 8, the connectors 30a to 30f may be arranged on the board 40 while forming a predetermined angle (approximately 90°) with respect to a direction in which the connection terminals 55a to 55d of the pin block 50 extend and protrude. Further, the connectors 30a to 30f may include connection ports opened in the rear direction (downward in FIG. 8) of the board 40. Since the connection port is arranged toward the rear direction of the board 40, the connection terminals 55a to 55d may be coupled to the connectors 30a to 30f when the board 40 is mounted on the base member 70.

The number of the connection terminals 55a to 55d and the number of connectors 30a to 30f may be the same, or may be different from each other as shown in FIG. 8. In other words, when only some of the functions provided by the board 40 are used, the number of connection terminals 55a to 55d may be less than the number of the connectors 30a to 30f. Typically, the number of connection terminals 55a to 55d may be equal to or less than the number of connectors 30a to 30f. However, the present disclosure is not limited thereto, and the number of connection terminals 55a to 55d may be greater than the number of connectors 30a to 30f.

Figure 9:
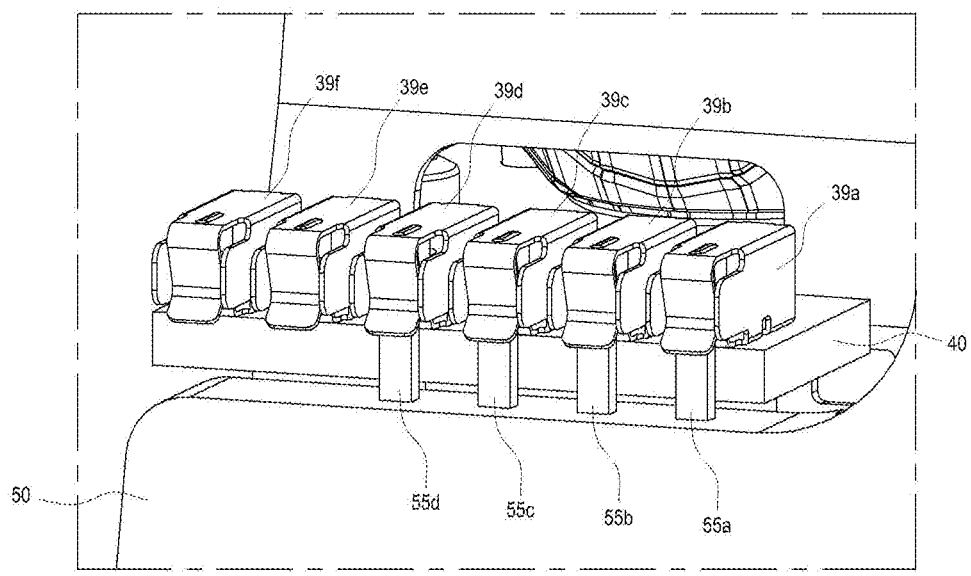
FIG. 9 is an enlarged perspective view showing a connector and a connection terminal according to another exemplary embodiment of the present disclosure.

FIG. 9 is an enlarged perspective view showing a connector 39 (39a to 39f) and the connection terminal 55 (55a to 55d) according to another exemplary embodiment of the present disclosure. In FIG. 9, other components are the same as in FIG. 8 except for a shape of the connector 39. The structure of the connector 39 according to this modified exemplary embodiment will be described in more detail with reference to FIGS. 10A to 10C.

Figure 10A:
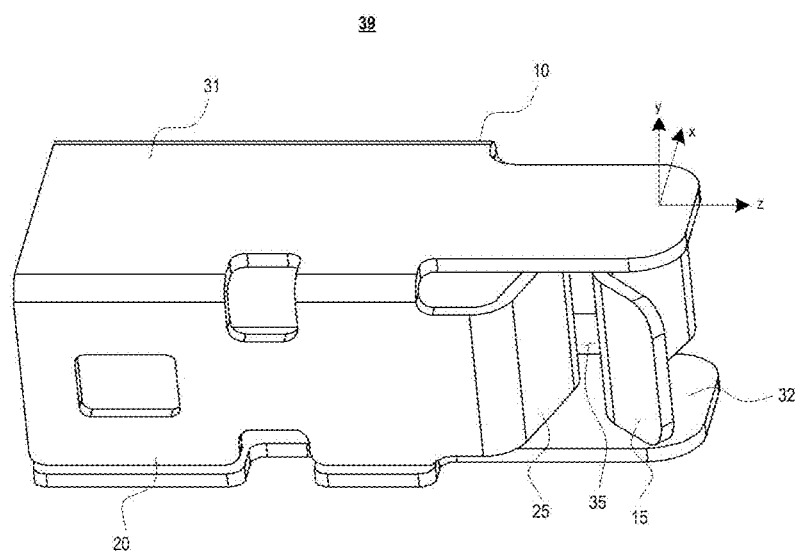
FIG. 10A is a bottom perspective view showing the connector according to the another exemplary embodiment of the present disclosure.
Figure 10B:
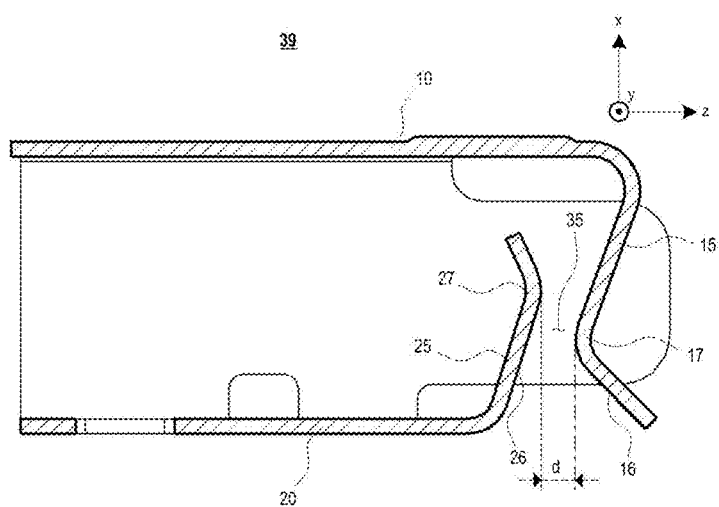
FIG. 10B is a longitudinal cross-sectional view of the connector of FIG. 10A according to the another exemplary embodiment of the present disclosure.

FIG. 10A is a perspective view of the connector 39 according to an exemplary embodiment of the present disclosure as viewed from below, and FIG. 10B is a longitudinal cross-sectional view (cut in parallel to the x-z plane) of the connector 39 of FIG. 10A.

Specifically, the connector 39 may include a first plate member 10, a second plate member 20 in parallel to and spaced apart from the first plate member 10, and a connection port 35 formed by an open space between the first plate member 10 and the second plate member 20. In addition, the connector 39 may further include a first bent portion 15 bent from the first plate member 10 toward the second plate member 20 and a second bent portion 25 bent from the second plate member 20 toward the first plate member 10 to form the connection port 35.

Here, an inner surface 16 of the first bent portion 15 and an outer surface 26 of the second bent portion 25 may face each other and be spaced apart by a predetermined distance d. The connection port 35 may be formed between the inner surface 16 of the first bent portion 15 and the outer surface 26 of the second bent portion 25. Accordingly, when the connection terminal 55 is inserted into the connection port 35 in an x-axis direction, the connection terminal 55 may be in contact with the inner surface 16 of the first bent portion 15 and the outer surface 26 of the second bent portion 25, respectively. By this contact, the connection terminal 55 and the connector 39 may be electrically connected.

Further, the first bent portion 15 may include a first protrusion 17 that protrudes toward the second bent portion 25, and the second bent portion 25 may include a second protrusion 27 that protrudes toward the first bent portion 15, so that while ensuring contact between the first and second bent portions 15 and 25 and the connection terminal 55, a bias force is appropriately applied to the inserted connection terminal 55. The bias force may be provided by elasticity of the first plate member 10 and the second plate member 20. Therefore, when the connection terminal 55 is inserted into the connection port 35, the connection terminal 55 may contact the first protrusion 17 and the second protrusion 27, respectively. In particular, a position of the first protrusion 17 and a position of the second protrusion 27 may be arranged slightly out of alignment (e.g., staggered). Such arrangement may help the inserted connection terminal 55 to have structural stability while receiving an elastic force within the connection port 35. For example, the second protrusion 27 may be disposed closer to the first plate member 10 than the first protrusion 17 is.

The connector 39 may further include a third plate member 31 and a fourth plate member 32 that are orthogonally connected to the first plate member 10 and the second plate member 20 (parallel to the x-z plane). The connection terminal 55 inserted into the connection port 35 may be prevented from being separated in a lateral direction (y direction) of the connection port 35 due to the third plate member 31 and the fourth plate member 32. As shown in FIG. 10A, in the exemplary embodiment of the present disclosure, the connector 39 may be made of a single conductor plate material, and the plate material may be bent continuously based on a longitudinal direction (z direction), thereby forming the first to fourth plate members 10, 20, 31, and 32.

Figure 10C:
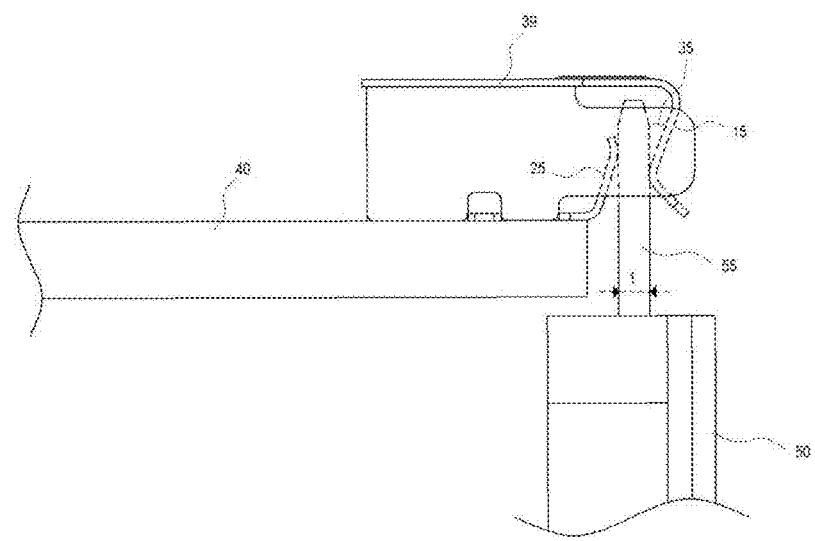
FIG. 10C is a side view showing a state that the connection terminal according to the exemplary embodiment of the present disclosure is inserted into a connection port of the connector.

FIG. 10C is a view showing a state in which the connection terminal 55 is inserted into the connection port 35 of the connector 39 according to the exemplary embodiment of the present disclosure. When the board 40 is mounted on the base member 70 in a state that the pin block 50 is already mounted on the base member 70, that is, the connection terminal 55 is arranged toward the front surface of the board 40 or the mounting surface of the base member 70, the connection port 35 of the connector 39 may be fitted to the connection terminal 55 to surround the connection terminal 55. In order to make this process more smoothly, a taper may be formed at a tip of the connection terminal 55.

In particular, since a thickness t of the connection terminal 55 is greater than an original, undeformed distance d between the inner surface 16 of the first bent portion 15 and the outer surface 26 of the second bent portion 25, a gap between the inner surface 16 of the first bent portion 15 and the outer surface 26 of the second bent portion 25 may be also increased to the thickness t. Here, the first bent portion 15 and the second bent portion 25 may be elastically deformed, and a force acting on the outer surface of the connection terminal 55 may be applied due to the elasticity. Therefore, the connection between the connection terminal 55 and the connector 39 may be made more robust.

According to the vehicle lamp 100 according to the exemplary embodiments of the present disclosure described above, processes of assembling the plurality of boards 40 after the pin block 50 may be automated more readily. In other words, the manufacturing efficiency may be improved by automation using robots, and at the same time, the manufacturing rate may be increased due to the reduction in the number of assembly processes. In addition, the problem of contact damage due to flow or shaking of the already formed wiring after completion of the assembly, the connector detachment, the disconnection of the terminal portion, and the problem of the pinching of the wiring may be solved reliably.

Further, the problems such as incorrect assembly and poor assembly in an environment where a large number of connecting wirings are required may be improved, and no separate error-proof means such as color coding of the board, color coding of the connector, differentiation of the number of pins, and the like is required. In addition, compared to the wiring and connector assembly manner in the related art, the space utilization may be improved. Therefore, the vehicle lamp 100 may become thinner and be reduced in size, and thus, the overall design freedom may be improved.

Various types of wiring may be formed in the pin block 50 used above. Therefore, when the connector 39 and the connection terminal 55 are coupled, the connection socket 51 formed on one side of the main body 52 may be electrically connected. As a result, the connection socket 51 may be electrically connected to the board 40 using the connection terminal 55 and the connector 39, so that when an external device (not shown) is connected to the connection socket 51, electrical connection between the external device and the board 40 may be established.

However, when the conventional wiring manner is used, the connection structure of the terminals in the pin block is complicated by the common use of the pin map (LAM). Accordingly, the number of required molds increases due to the excessive number of terminals in the pin block. The increase in the number of molds leads to an increase in the number of processes and production costs, and an increase in terminal insertion work leads to an increase in production time.

Figure 11A:
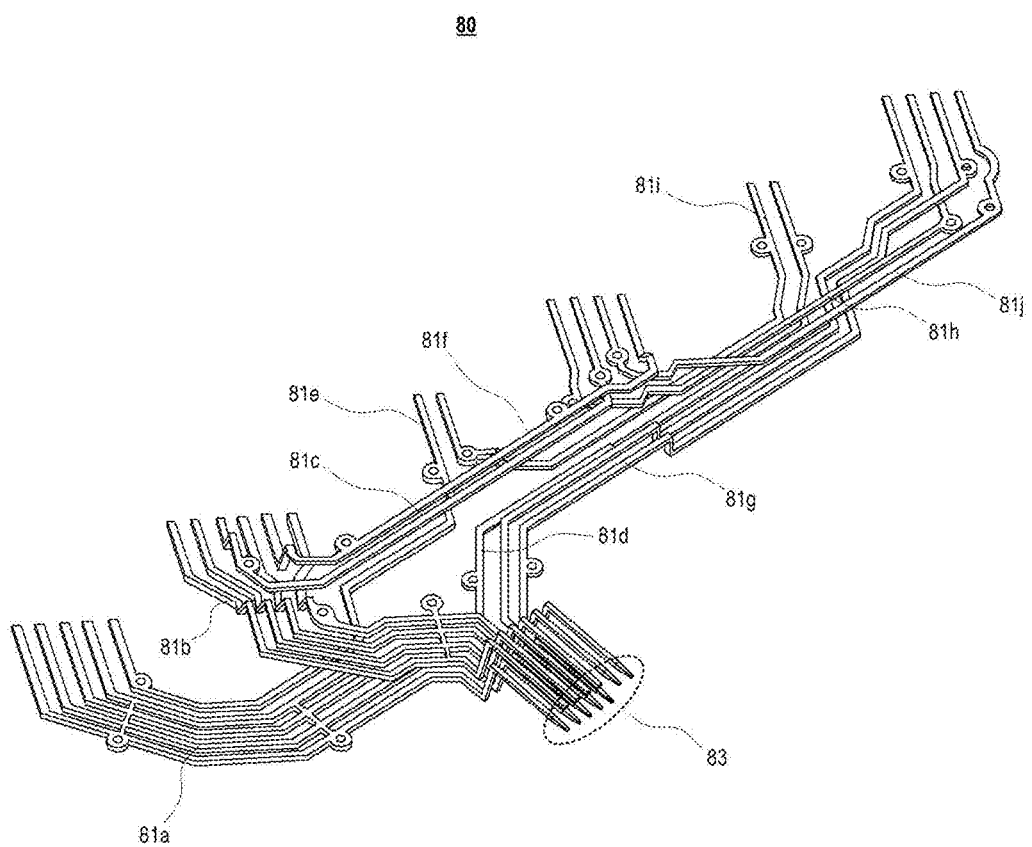
FIG. 11A is a perspective view showing an example of a wiring structure in a pin block according to an exemplary embodiment of the present disclosure.

FIG. 11A is a perspective view showing an example of the wiring structure in a pin block according to an exemplary embodiment of the present disclosure. Referring to FIG. 11A, the number of terminals for connecting to the connector 30 on the board 40 is 23, and an output terminal on a connection socket side is 12 pins, or 11 pins excluding an NC (No Contact) pin. In this exemplary embodiment, at least 10 terminals cannot be connected to the connection socket, and should be connected only through mutual terminals. Therefore, a total of five internal wirings are required. In this case, assuming that the pin block includes two layers, at least seven types, in fact, about 10 wiring types are required as shown in FIG. 11A.

When the wiring of this structure is made by a mold, in addition to a mold for the two layers, an additional mold is needed to secure an additional layer for the internal wiring. Depending on a situation, a plurality of internal wirings may be formed in the same layer, thereby reducing the number of additional molds to some extent. However, increased internal wiring requires an increased number of molds.

Figure 11B:
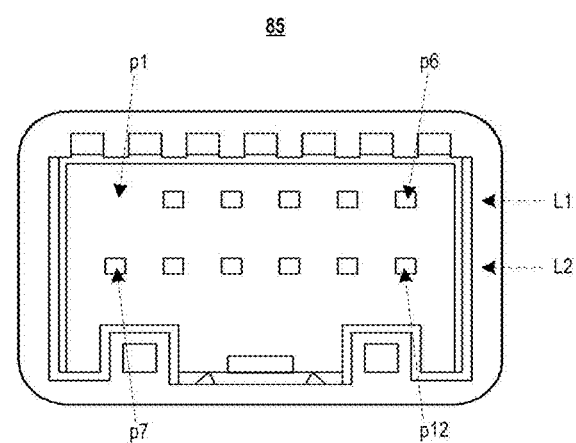
FIG. 11B is a plan view showing 12 pins of a 12-pin connection socket formed on the pin block of FIG. 11A.

FIG. 11B is a plan view showing 12 pins of a 12-pin connection socket 85 formed on the pin block. Here, a first pin p1 is an unused NC (No Contact) pin, and a total of 11 pins are actually available. Among them, the first pin p1 to the sixth pin p6 are disposed in a first layer L1, and the seventh pin p7 to the twelfth pin p12 are disposed in a second layer L2. A direction of numbering layers may be arbitrarily selected. However, hereinafter, in the present disclosure, the layer will be described with reference to increasing numbers from top to bottom.

As shown in FIGS. 11A and 11B, in a structure in which a plurality of light irradiation units are connected in series, only the first and last wires 83 used for the series connection may be connected to the connection socket 85, and all other wires used for the remaining intermediate connections may be connected by internal wiring. The presence of multiple internal wirings inevitably creates multiple intersections between the wirings. Since the multiple intersections should be electrically insulated from each other, a spatially different layer is required. This structure may occur essentially regardless of the number of pins defined in each layer in the connection socket 85. This is because the internal wiring is not a conducting wire connected to the outside through the connection socket 85 and a plug coupled thereto.

Conversely, the present disclosure provides a new wiring structure for minimizing the number of molds designed for each layer by minimizing the internal wiring, and the number of processes for connecting the internal wiring and the connector 30. Accordingly, the new wiring structure may extend the terminal requiring the internal wiring to the connection socket of the pin block, and when the connection socket and a detachable plug are coupled with the connection socket, the electrical connection equivalent to the internal wiring may be established.

Figure 12A:
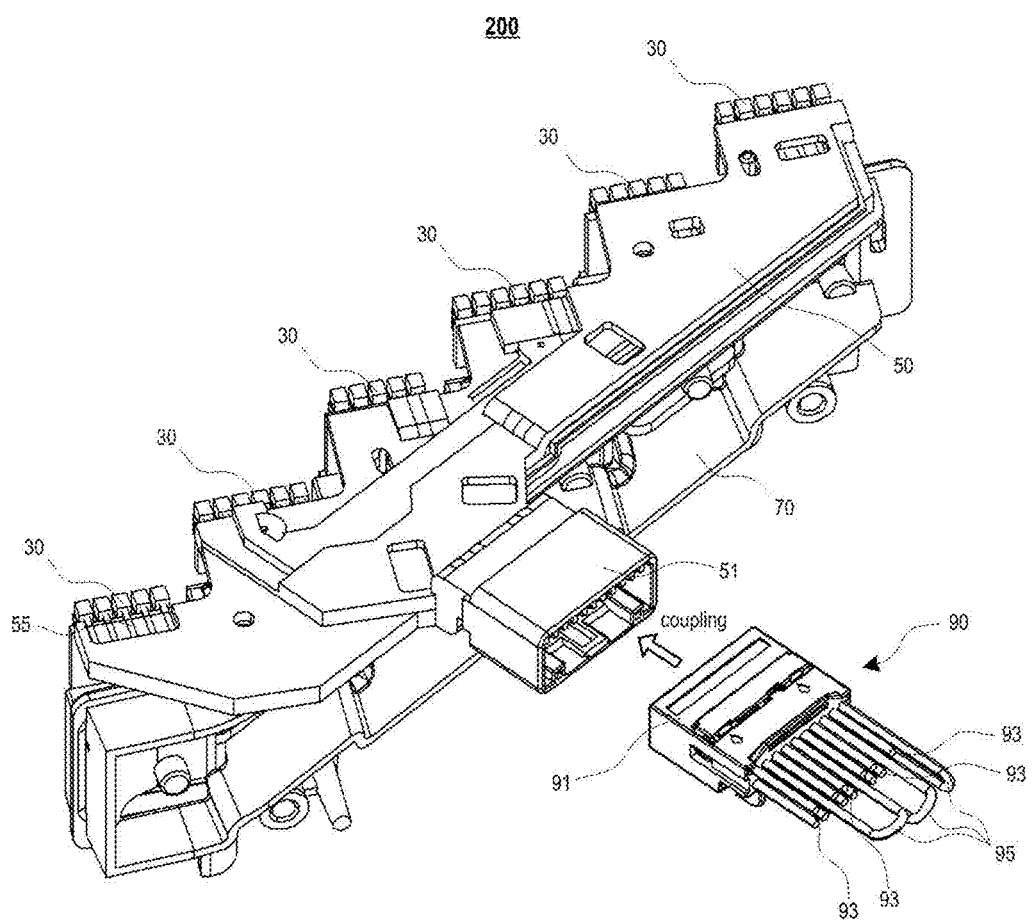
FIG. 12A is a perspective view showing the vehicle lamp according to the another exemplary embodiment of the present disclosure.

FIG. 12A is a perspective view showing a vehicle lamp 200 according to another exemplary embodiment of the present disclosure. The vehicle lamp 200 may further include a plug 90 detachably coupled to the connection socket 51 compared to the vehicle lamp 100 described above. Therefore, the vehicle lamp 200 may also include the connector 30 formed on the board 40 on which the light irradiation unit is mounted, the connection terminal 55 coupled with the connector 30, the wiring 110 that extends from the connection terminal 55 to the connection socket 51, and the connection socket 51.

The plug 90 may include a cable that connects the connection socket to the outside, and a body 91 detachably coupled to the connection socket 51. The cable may include a plurality of extension conductors 93 and a sheath surrounding the extension conductors 93, as is generally known. Here, for simplicity of explanation, the sheath is not shown in the drawings. However, the configuration of the electrical cables is known to those skilled in the art.

In particular, according to an exemplary embodiment of the present disclosure, in addition to the components described above, the plug 90 may include a return wiring 95 for electrically connecting at least one pair of wirings of the plurality of wirings 110 included in the pin block 50 to each other (e.g., to make interconnection, cross-connection, or "jump-connection"). In FIG. 12A, the return wiring 95 is illustrated as being formed at three locations. However, the present disclosure is not limited thereto, and the number may vary depending on the design requirement and the number of pins of the connection socket 51.

Due to this configuration, at least one pair of wirings formed in the pin block 50 and extending to the connection terminal 55 and to the connection socket 51 may be in an electrically isolated state when the plug 90 is separated from the connection socket 51. However, when the plug 90 is coupled to an opening of the connection socket 51 to establish mutual connection, the pair of wirings may be electrically connected through the return wiring 95.

Figure 12B:
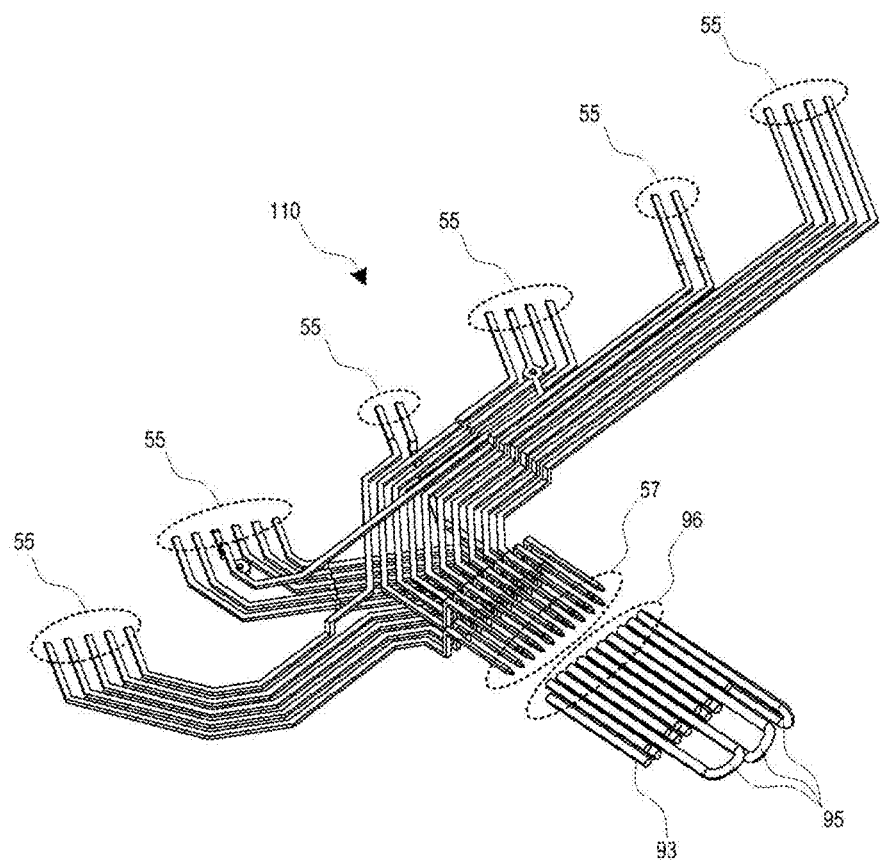
FIG. 12B is a perspective view showing a structure of a plurality of wirings formed inside the pin block.

FIG. 12B is a perspective view showing the structure of the plurality of wirings 110 formed inside the pin block 50. As shown in FIG. 12B, the connection terminals 55 may be formed at first ends of the plurality of wirings 110 for connection with the connector 30 of the circuit board 40, and socket pins 57 may be formed at second ends of the plurality of wirings 110 for connection with plug pins 96 of the plug 90. Therefore, through the connection between the socket pin 57 and the plug pin 96, the connector 30 of the circuit board 40 may be electrically connected to the outside (external device, external board, or power supply).

In particular, a part of the plug pin 96 may be connected to the return wiring 95, and thereby making interconnects therebetween. By this return wiring 95, an electrical passage may be formed between two terminals that are required to be connected to each other. Accordingly, the formation of the electrical passage by the action of the return wiring 95 occurs only when the plug 90 is coupled to the connection socket 51. When the plug 90 and the connection socket 51 are separated, the electrical passage is disconnected.

Figure 13:
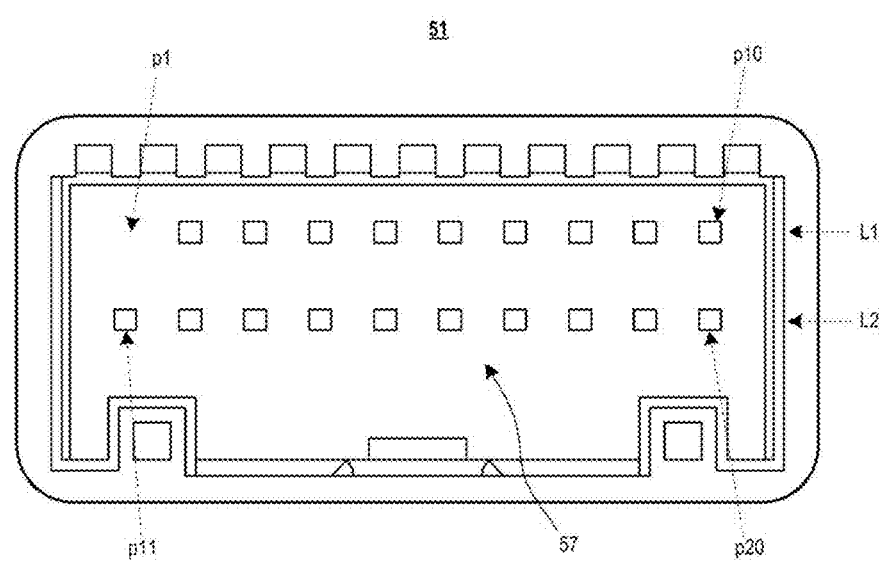
FIG. 13 is a plan view of a connection socket having 20 socket pins viewed from a direction of an opening in which a plug is coupled.

FIG. 13 is a plan view of the connection socket 51 having 20 socket pins 57 viewed from a direction of an opening in which the plug 90 is coupled. Here, a first pin p1 is an unused NC (No Contact) pin, so there are actually a total of 19 pins available. Among them, the first pin p1 to the tenth pin p10 may be disposed in a first layer L1, and the eleventh pin p11 to the twentieth pin p20 may be disposed in a second layer L2.

Comparing FIG. 13 with FIG. 11B described above, the number of connection pins formed in the connection socket 51 for the return wiring 95 described above has increased from 12 to 20, but the number of layers is still two. Therefore, even if the number of pins connected in one layer increases, a layer added due to internal wiring may be minimized. Here, the added layer means a layer that must be formed in the pin block regardless of a layer of the connection socket. In other words, in the connection socket 85 of FIG. 11B, the socket pins have two layers, but the wiring inside the block pin 50 requires the addition of a layer to avoid interference, which causes an increase in a thickness of the block pin 50 and the number of molds. On the contrary, when the return wiring 95 is used as shown in FIGS. 12A and 12B, the number of pins present in one layer in the connection socket 51 may increase, and the number of layers inside the block pin 50 may be minimized. This is because an increase in the number of pins in a single layer does not cause an increase in the number of molds.

Figure 14A:
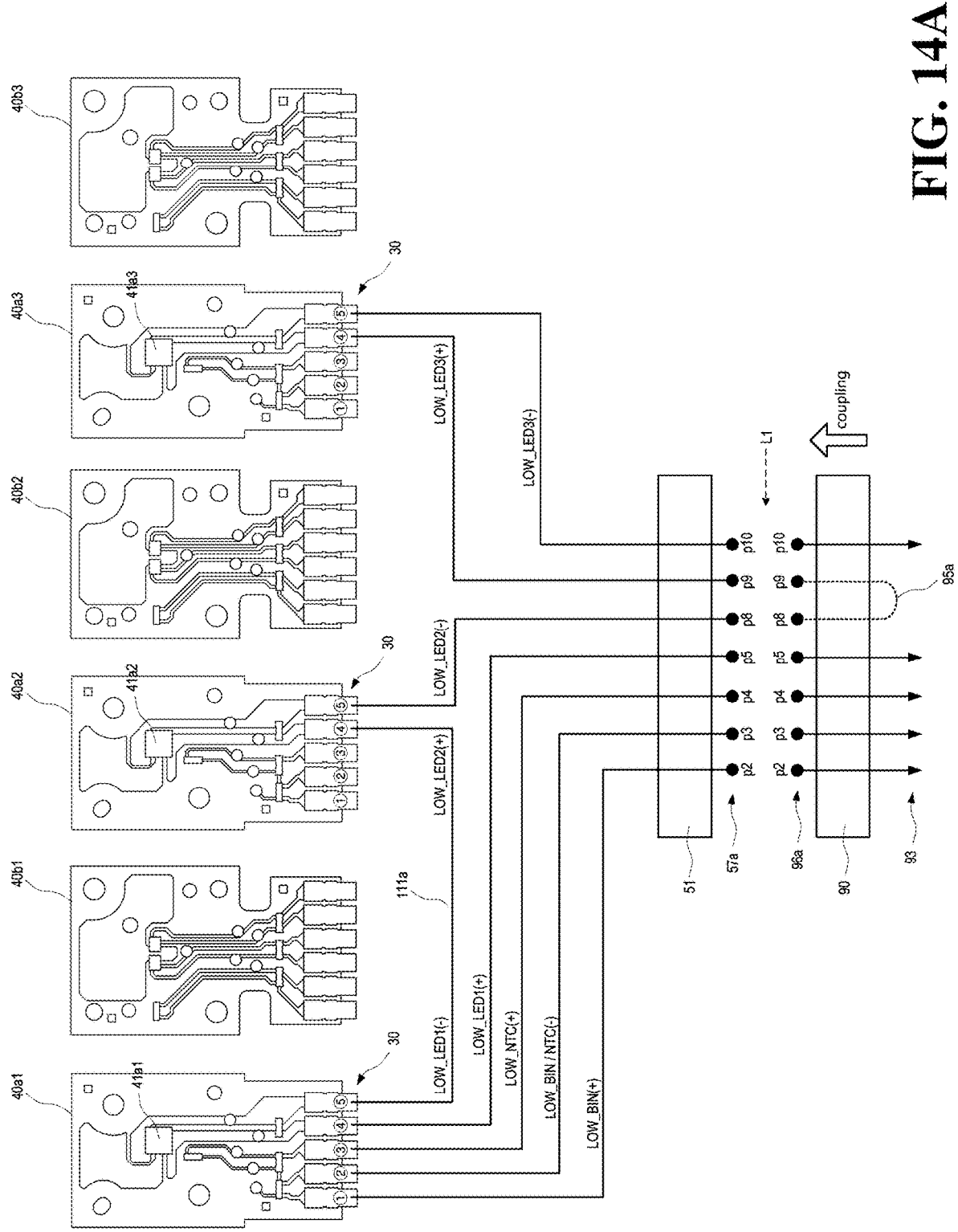
FIG. 14A is a detailed view of an overall pin map in a first layer of FIGS. 13, and 14B is a detailed view of the overall pin map in a second layer of FIG. 13.
Figure 14B:
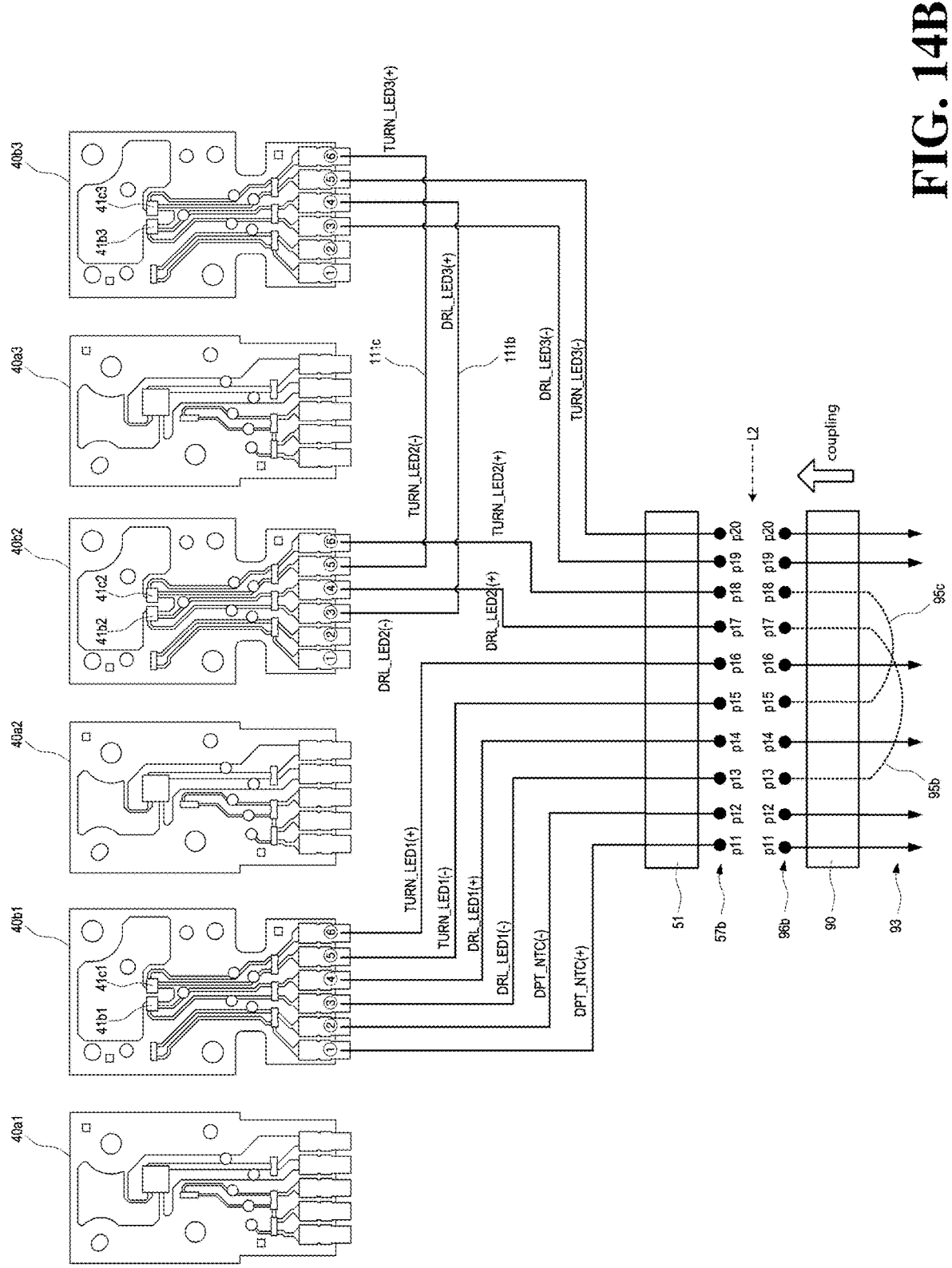

According to an exemplary embodiment of the present disclosure, FIG. 14A is a detailed view of the overall pin map in the first layer of FIG. 13, and FIG. 14B is a detailed view of the overall pin map in the second layer of FIG. 13. As described above, the pin block 50 arranged on one side of the base member 70 may include the connection socket 51 and a plurality of wirings, one end of which is connected to the light irradiation units 60a and 60b, and the other end of which is connected to the connection socket 51. The plurality of wirings may include a first wiring array arranged on the first layer L1 of the pin block 50, and a second wiring array arranged on the second layer L2 different from the first layer. Accordingly, FIG. 14A shows a pin map for the first wiring array, and FIG. 14B shows a pin map for the second wiring array.

In FIG. 14A, first circuit boards 40a1, 40a2, and 40a3 of the same type among a plurality of circuit boards 40a1, 40a2, 40a3, 40b1, 40b2, and 40b3 may be connected to the first wiring array. Similarly, in FIG. 14B, second circuit boards 40b1, 40b2, and 40b3 of the same type among the plurality of circuit boards 40a1, 40a2, 40a3, 40b1, 40b2, and 40b3 may be connected to the second wiring array. In FIGS. 14A and 14B, it is exemplified that the total number of circuit boards is six, and the types of circuit boards are two. However, the present disclosure is not limited thereto, and the number and type of the circuit boards may vary depending on an embodiment.

In general, since the circuit board depends on the type of light irradiation unit to which it is mounted, it may be considered that the number and type of the circuit board is the same as the number and type of light irradiation units. Specifically, the first circuit boards 40a1, 40a2, and 40a3 may be equipped with a first light irradiation unit having a first function, and the second circuit boards 40b1, 40b2, and 40b3 may be equipped with a second light irradiation unit having a second function. Consequently, the first light irradiation unit may be connected to the first wiring array, and the second light irradiation unit may be connected to the second wiring array.

Various unique functions of a vehicle lighting may be encompassed for the vehicle lamp according to the present disclosure, including headlights, daytime running lights (DRL), position lights, or turn signals. In an exemplary embodiment of the present disclosure, the first function of the first light irradiation unit may be a headlight irradiation function, and the second function of the second light irradiation unit may include daytime running light (DRL) and turn signal function. However, the present disclosure is not limited thereto, and any embodiments replacing or adding some or all of other functions such as position lights, brake lights, or fog lights will be also possible.

Referring to FIG. 14A, the circuit boards 40a1, 40a2, and 40a3 may each have five connectors ① to ⑤. Here, LOW_BIN and LOW_NTC may indicate wiring for obtaining BIN information and temperature information from the circuit boards 40a1, 40a2, and 40a3 on which a low beam light irradiation unit is mounted, respectively. LOW_BIN/NTC may indicate common wiring for negative poles of LOW_BIN and LOW_NTC.

In general, the BIN information refers to data indicating specifications of various circuit boards, and the temperature information refers to data obtained in the form of electrical signals from a negative temperature coefficient-thermic resistor (NTC). The BIN information or the temperature information may be obtained from each circuit board. However, since the same circuit boards are connected in series, it may be sufficient to obtain the information from one of the circuit boards. Therefore, in FIG. 14A and subsequent drawings, it is assumed that the information is obtained only from the first circuit boards 40a1 and 40b1.

As shown in FIG. 14A, among the connection pins 57a of the connection socket 51, a pin p2, a pin p3 and a pin p4 may be respectively connected to three connectors ① to ③ of the first circuit board 40a1. Subsequently, a pin p5 may be connected to a connector 4 ④ of the first circuit board 40a1 as a positive LOW_LED1(+) wiring of a first LED 41a1 to form a low beam. Thereafter, an electric current that passes through the light irradiation unit mounted on the circuit board 40a1 may flow into the connector 4 ④ of the second circuit board 40a2 through a connector 5 ⑤ and an internal wiring 111a. Here, cathode LOW_LED1(−) of the first LED 41a1 of the low beam may be connected to anode LOW_LED2(+) of a second LED 41a2 and the internal wiring 111a.

Subsequently, the electric current that passes through the second LED 41a2 may again flow to a wiring for cathode LOW_LED2(−) of the second LED 41a2 through the connector 5 ⑤ of the second circuit board 40a2. Then, the electric current may return through the return wiring 95a of the plug 90 via a pin p8 of the connection socket 57a. At this time, the connection socket 51 and the plug 90 may be in a coupled state. Accordingly, each connection pin 57a of the connection socket 51 may be electrically connected to each plug pin 96a of the plug 90 corresponding thereto.

The electric current returning from the return wiring 95a may flow into the connector 4 ④ of a third LED 41a3 through the wiring for anode LOW_LED3(+) of the third LED 41a3. Finally, the electric current that passes through the third LED 41a3 may flow to a wiring for cathode LOW_LED3(−) of the third LED 41a3 through the connector 5 ⑤ and may finally pass through a pin p10 to flow out again. Through this process, the electric current may flow from the pin p5 to the pin p10 through the three LEDs 41a1, 41a2, and 41a3 connected in series.

In this entire process, one internal wiring 111a and one return wiring 95a may be used. A pair of wirings LOW_LED2(−) and LOW_LED3 (+) connected to the return wiring 95a may be arranged in the same layer (first layer) in the pin block 50. As such, the present disclosure is not limited to connecting all pairs of wirings that require interconnects using the return wiring. Instead, some pairs of wirings that require interconnects may use the return wiring 95a, and other pairs of wiring that require interconnects may use the internal wiring 111a formed internally. In other words, hybrid wiring scheme may be used. Even if some of the internal wiring 111a is used as shown in FIG. 14A, interference with other wirings may be prevented from occurring. Therefore, an addition of a layer and an additional mold due to the internal wiring may be unnecessary.

FIG. 14A shows the pin map in the first layer of the pin block 50, while FIG. 14B shows the pin map in the second layer (lower layer) of the pin block 50. Referring to FIG. 14B, the circuit boards 40b1, 40b2, and 40b3 may each have six connectors ① to ⑥. Here, DPT_NTC may indicate wiring for obtaining temperature information from the circuit boards 40b1, 40b2, and 40b3 equipped with a light irradiation unit for functions other than a headlight such as daytime running light (DRL), position light, or turn signal. At this time, among the connection pins 57b of the connection socket 51, a pin p11 and a pin p12 may be respectively connected to two connectors ① and ② of the first circuit board 40b1.

Subsequently, an electric current for the DRL may flow to a pin p14, and finally to a pin p19 through the LEDs 41b1, 41b2, and 41b3 for three DRLs. Further, an electric current for a turn signal may flow into a pin p16, and finally to a pin p20 through three turn signal LEDs 41c1, 41c2, and 41c3.

In this process, two internal wirings 111b and 111c and two return wirings 95b and 95c may be used. The connection socket 51 and the plug 90 may be in a coupled state to allow an electric current to flow through the return wirings 95b and 95c. Therefore, each connection pin 57b of the connection socket 51 may be electrically connected to each plug pin 96b of the plug 90 corresponding thereto.

The paths through which the electric currents for the DRL and the turn signal flow are arranged in order, and shown in Table 1 below.

TABLE 1

| Order | Current flow for DRL | Current flow for turn signal |
|---|---|---|
| 1 | p14 | p16 |
| 2 | DRL_LED1(+) wiring | TURN_LED1(+) wiring |
| 3 | Terminal 4 of circuit board 40b1 equipped with LED 41b1 | Terminal 6 of circuit board 40b1 equipped with LED 41c1 |
| 4 | Voltage drop on LED 41b1 | voltage drop on LED 41c1 |
| 5 | Terminal 3 of circuit board 40b1 equipped with LED 41b1 | Terminal 5 of circuit board 40b1 equipped with LED 41c1 |
| 6 | p13 | p15 |
| 7 | return wiring 95b | return wiring 95c |
| 8 | p17 | p18 |
| 9 | Terminal 4 of circuit board 40b2 equipped with LED 41b2 | Terminal 6 of circuit board 40b2 equipped with LED 41c2 |
| 10 | Voltage drop on LED 41b2 | Voltage drop on LED 41c2 |
| 11 | Terminal 3 of circuit board 40b2 equipped with LED 41b2 | Terminal 5 of circuit board 40b2 equipped with LED 41c2 |
| 12 | internal wiring 111b | internal wiring 111c |
| 13 | Terminal 4 of circuit board 40b3 equipped with LED 41b3 | Terminal 6 of circuit board 40b3 equipped with LED 41c3 |
| 14 | Voltage drop on LED 41b3 | Voltage drop on LED 41c3 |
| 15 | Terminal 3 of circuit board 40b3 equipped with LED 41b3 | Terminal 5 of circuit board 40b3 equipped with LED 41c3 |
| 16 | DRL_LED3(−) wiring | TURN_LED3(−) wiring |
| 17 | p19 | p20 |

As such, a total of two return wirings 95b and 95c and a total of two internal wirings 111b and 111c may be used in the second layer of the pin block 50. The reason that not all of the internal wirings 111b and 111c are implemented as the return wiring is due to the limitation of the number of pins (10) in the second layer. Therefore, the number of internal wirings may be further reduced by increasing the number of pins of the connection socket 51 or relocating some internal wiring to another layer. In the latter case, one of the two internal wirings in FIG. 14B may be relocated to the first layer and converted to the return wiring. Because only 7 of the 9 available pins in FIG. 14A are used, the additional return wiring may be accommodated.

Figure 15:
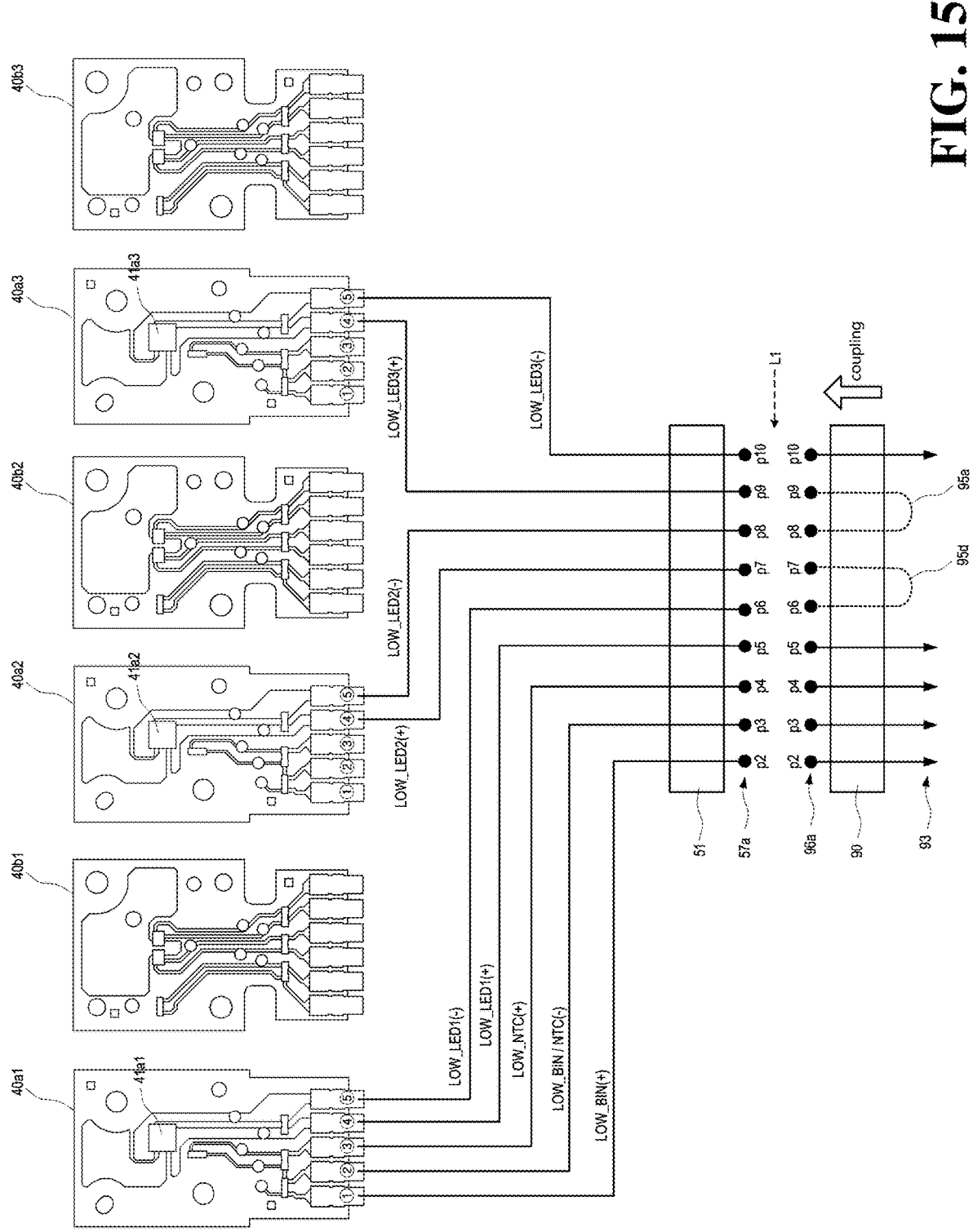
FIG. 15 is a view showing a pin map according to an exemplary embodiment modified from FIG. 14A.

As another exemplary embodiment, one internal wiring 111a remaining in FIG. 14A may be implemented as the return wiring. FIG. 15 is a view showing a pin map according to another exemplary embodiment modified from FIG. 14A. Referring to FIG. 15, the internal wiring 111a of FIG. 14A may be implemented as a return wiring 95d using pins p6 and p7. Accordingly, all of the internal wiring 111a may be removed from the first layer of the pin block 50.

In the exemplary embodiments described above, it is described that all pairs of wirings connected by the return wiring are formed in the same layer (first or second layer) of the pin block. This structure assumes that the same type of circuit board is arranged in the same layer of the pin block 50. However, the present disclosure is not limited thereto. Circuit boards of the same type may be arranged in different layers to ensure that there are no unused pins in the construction of the connection socket with a limited number of pins, or to simplify the wiring arrangement used within one layer and reduce the total wiring length. In this case, a pair of wiring connected by the return wiring may be arranged in different layers of the pin block. For example, one pin forming the return wiring may be arranged in the first layer and the other pin may be arranged in the second layer.

Figure 16A:
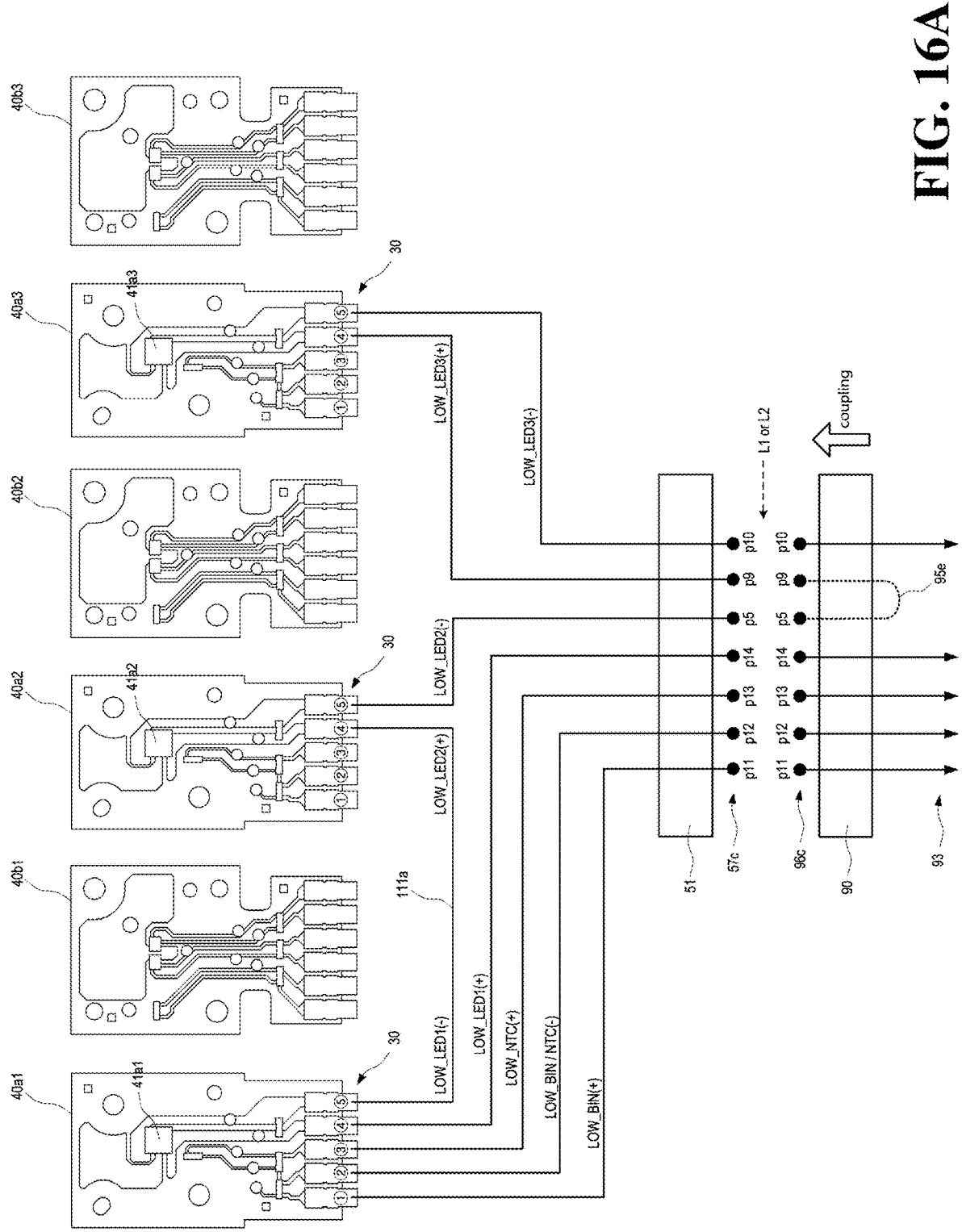
FIGS. 16A and 16B are views showing another exemplary embodiment in which circuit boards of the same type are arranged in different layers.
Figure 16B:
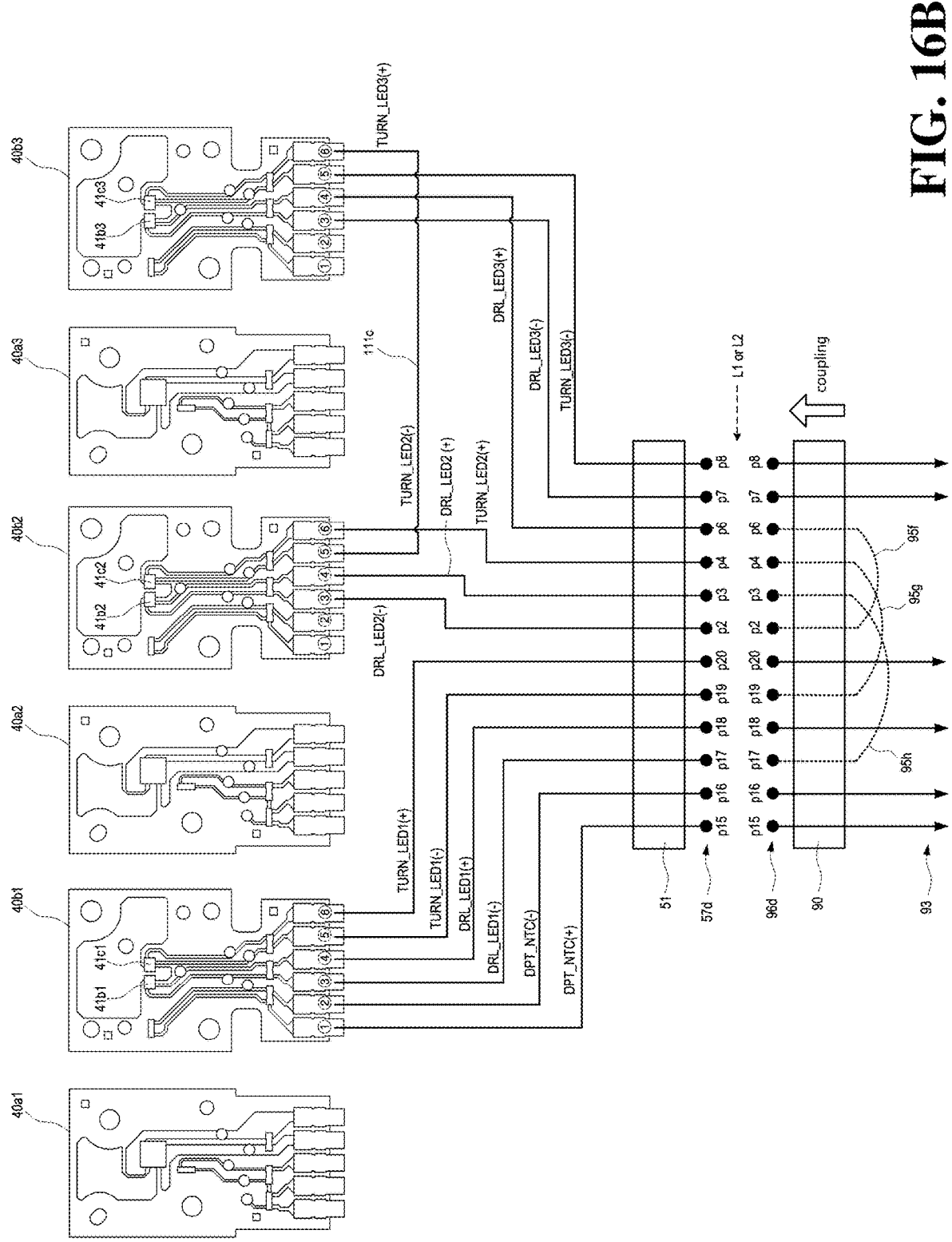

FIGS. 16A and 16B are views showing an example in which circuit boards of the same type are arranged in different layers (or alternatively stated, an example in which circuit boards of different types are arranged in the same layer). In FIGS. 14A and 14B described above, since the same type of circuit board is arranged for each layer, each drawing is also illustrated for each layer. In comparison, in FIGS. 16A and 16B, even the same type of circuit board may be connected by different layers, and thus, drawings are not divided for each layer, and the connection relationship between each wiring and connection pin is displayed in detail.

Referring to FIGS. 16A and 16B, a total of 19 connection pins except the NC may be used to configure a wiring scheme in the pin block 50. Specifically, the circuit boards 40a1, 40a2, and 40a3 may each have five connectors ① to ⑤.

Here, LOW_BIN and LOW_NTC may indicate wiring for obtaining BIN information and temperature information from the circuit boards 40a1, 40a2, and 40a3 on which a low beam light irradiation unit is mounted, respectively. In addition, LOW_BIN/NTC may indicate common wiring for negative poles of LOW_BIN and LOW_NTC.

First, among connection pins 57c of the connection socket 51, pins p11 to p13 may be connected to three connectors ①, ②, and ③ of the first circuit board 40a1, respectively, through LOW_BIN(+), LOW_BIN/NTC(−) and LOW_NTC(+) wirings. Subsequently, an electric current for forming a low beam may flow into the pin p14 and finally to the pin p10 through the three LEDs 41a1, 41a2, and 41a3.

Here, for example, the internal wiring 111a may be connected between the connector 5 ⑤ of the LED1 41a1 and the connector 4 ④ of the LED2 41a2, and a return wiring 95e may be connected between the connector 5 ⑤ of the LED2 41a2 and the connector 4 ④ of the LED3 41a3. The connection socket 51 and the plug 90 may be in a coupled state to allow an electric current to flow through the return wiring 95e. Accordingly, each connection pin 57b of the connection socket 51 may be electrically connected to each plug pin 96b of the plug 90 corresponding thereto.

The paths through which the electric current flows through the plurality of low beam LEDs 41a1, 41a2, and 41a3 are arranged in order and represented in Table 2 below.

TABLE 2

| Order | Current flow for low beam |
|---|---|
| 1 | p14 |
| 2 | LOW_LED(+) wiring |
| 3 | Terminal 4 of circuit board 40a1 equipped with LED 41a1 |
| 4 | Voltage drop on LED 41a1 |
| 5 | Terminal 5 of circuit board 40a1 equipped with LED 41a1 |
| 6 | internal wiring 111a |
| 7 | Terminal 4 of circuit board 40a2 equipped with LED 41a2 |
| 8 | Voltage drop on LED 41a2 |

TABLE 2-continued

| Order | Current flow for low beam |
|---|---|
| 9 | Terminal 5 of circuit board 40a2 equipped with LED 41a2 |
| 10 | p5 |
| 11 | return wiring 95e |
| 12 | p9 |
| 13 | Terminal 4 of circuit board 40a3 with LED 41a3 |
| 14 | Voltage drop on LED 41a3 |
| 15 | Terminal 5 of circuit board 40a3 equipped with LED 41a3 |
| 16 | LOW_LED3(−) wiring |
| 17 | p10 |

FIG. 16B shows the structure of a wiring of the remaining 12 connection pins in addition to the 7 connection pins shown in FIG. 16A. Referring to FIG. 16B, the circuit boards 40b1, 40b2, and 40b3 may each have six connectors ① to ⑥. Here, DPT_NTC may indicate wiring for obtaining temperature information from the circuit boards 40b1, 40b2, and 40b3 equipped with a light irradiation unit for functions other than a headlight such as daytime running light (DRL), position light, or turn signal. At this time, among connection pins 57d of the connection socket 51, a pin p15 and a pin p16 may be respectively connected to two connectors ① and ② of the first circuit board 40b1.

Subsequently, an electric current for a DRL may flow to a pin p19 and finally to a pin p7 through the LEDs 41b1, 41b2, and 41b3 for three daylights. Further, an electric current for a turn signal may flow into a pin p20 and finally to a pin p8 through three turn signal LEDs 41c1, 41c2, and 41c3.

In this process, one internal wiring 111c and three return wirings 95f, 95g, and 95h may be used. The connection socket 51 and the plug 90 may be in a coupled state to allow an electric current to flow through the return wirings 95f, 95g, and 95h. Accordingly, each connection pin 57d of the connection socket 51 may be electrically connected to each plug pin 96d of the plug 90 corresponding thereto.

The paths through which the currents for the DRL and the turn signal flow are arranged in order, and shown in Table 3 below.

TABLE 3

| Order | Current flow for daylight | Current flow for turn signal |
|---|---|---|
| 1 | p18 | p20 |
| 2 | DRL_LED1(+) wiring | TURN_LED1(+) wiring |
| 3 | Terminal 4 of circuit board 40b1 equipped with LED 41b1 | Terminal 6 of circuit board 40b1 equipped with LED 41c1 |
| 4 | Voltage drop on LED 41b1 | Voltage drop on LED 41c1 |
| 5 | Terminal 3 of circuit board 40b1 equipped with LED 41b1 | Terminal 5 of circuit board 40b1 equipped with LED 41c1 |
| 6 | p17 | p19 |
| 7 | return wiring 95h | return wiring 95g |
| 8 | P3 | p4 |
| 9 | Terminal 4 of circuit board 40b2 equipped with LED 41b2 | Terminal 6 of circuit board 40b2 equipped with LED 41c2 |
| 10 | Voltage drop on LED 41b2 | Voltage drop on LED 41c2 |
| 11 | Terminal 3 of circuit board 40b2 equipped with LED 41b2 | Terminal 5 of circuit board 40b2 equipped with LED 41c2 |
| 12 | p2 | internal wiring 111c |
| 13 | return wiring 95f | Terminal 6 of circuit board 40b3 equipped with LED 41c3 |
| 14 | p6 | Voltage drop on LED 41c3 |
| 15 | Terminal 4 of circuit board 40b3 equipped with LED 41b3 | Terminal 5 of circuit board 40b3 equipped with LED 41c3 |

TABLE 3-continued

| Order | Current flow for daylight | Current flow for turn signal |
|---|---|---|
| 16 | Voltage drop on LED 41b3 | TURN_LED3(−) wiring |
| 17 | Terminal 3 of circuit board 40b3 equipped with LED 41b3 | P8 |
| 18 | DRL_LED3(−) wiring | |
| 19 | p7 | |

Referring to FIGS. 16A and 16B described above, four socket pins p11 to p14 connected to the circuit board 40a1 for the low beam and a circuit board 40b1 for the DRL/turn signal may be connected to a total of ten socket pins p11 to p20 included in the second layer L2. Therefore, it may be seen that the adjacent circuit boards 40a1 and 40b1 of different types may be connected to the same layer L2. By this configuration, the wiring arrangement in the corresponding layer L2 may be simplified and the total wiring length in the layer L2 may also be reduced. Accordingly, the size and/or complexity of a mold may be decreased when manufacturing a mold for forming the layer L2.

When FIGS. 16A and 16B described above are implemented, a total of two internal wirings 111a and 111c and a total of four return wirings 95e, 95f, 95g, and 95h may be used. Among these, unlike the return wiring, the internal wiring may require a separate additional layer when manufacturing a mold. However, compared to a conventional case where only the internal wiring was used without a return wiring, the number of the additional layers may be minimized because the number of internal wirings may be decreased, for example from 6 to 2. This description is based on a 20-pin connector, and thus, all of the internal wiring may be removed if designed with a 24-pin connector structure.

Figure 17:
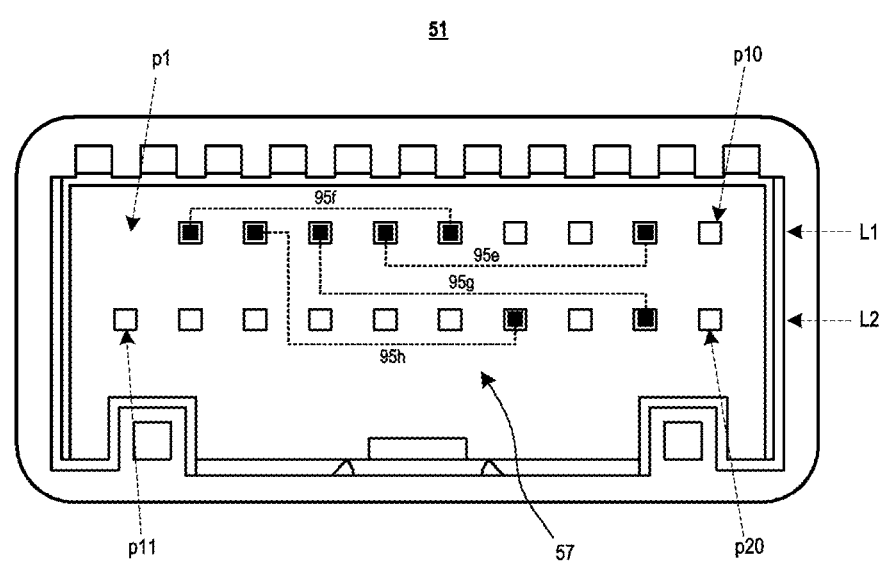
FIG. 17 is a view showing a position of a socket pin to which a return wiring is applied in the another exemplary embodiment as shown in FIGS. 16A and 16B on a connection socket according to the another exemplary embodiment of the present disclosure.

FIG. 17 is a view showing a position of the socket pin 57 to which the return wiring is applied in the exemplary embodiment as shown in FIGS. 16A and 16B on the connection socket 51. Referring to FIG. 17, compared to the exemplary embodiment shown in FIGS. 14a and 14b, the return wiring may traverse across different layers, without being limited within a single layer L1 or L2. Therefore, in this case, a pair of wirings in the pin block 50 connected by the return wiring will also be arranged between different layers.

As such, FIG. 17 exemplifies a structure where two return wirings 95f and 95e are formed in the same layer L1, and the remaining return wirings 95g and 95h are formed across different layers L1 and L2. However, the present disclosure is not limited thereto. The return wiring may be formed in the same layer as shown in FIGS. 14A and 14, and the return wiring may be formed only across different layers.

According to a structure of the pin block 50 that implements all or part of the internal wiring 111 as the return wiring 95 in one pin block 50, the cost and production time may be reduced by the optimized design of the pin block while using the same circuit board. Further, since the connection by the return wiring 95 may be made by merely inserting the plug 90 into the connection socket 51, it is also advantageous in the assembly process of the vehicle lamp.

In the above exemplary embodiments, it was exemplified that the board included in the light irradiation unit is mounted on the first surface of the base member, the pin block is mounted on the second surface of the base member, and connection terminals extended from the pin block are inserted into the connectors arranged in the board. However, the present disclosure is not limited to the above exemplary embodiments. In lieu of the connectors, the board may include apertures electrically connected to wires which extend from the light source. As illustrated in FIG. 6, after the pin block is mounted on the base member, the connection terminals may be inserted into the apertures concurrently when the board is mounted on the first surface of the base member. Thereafter, the connection terminals and the corresponding apertures may are fixedly connected, for example by means of soldering during an interconnection process such as a robot-soldering.

Figure 18A:
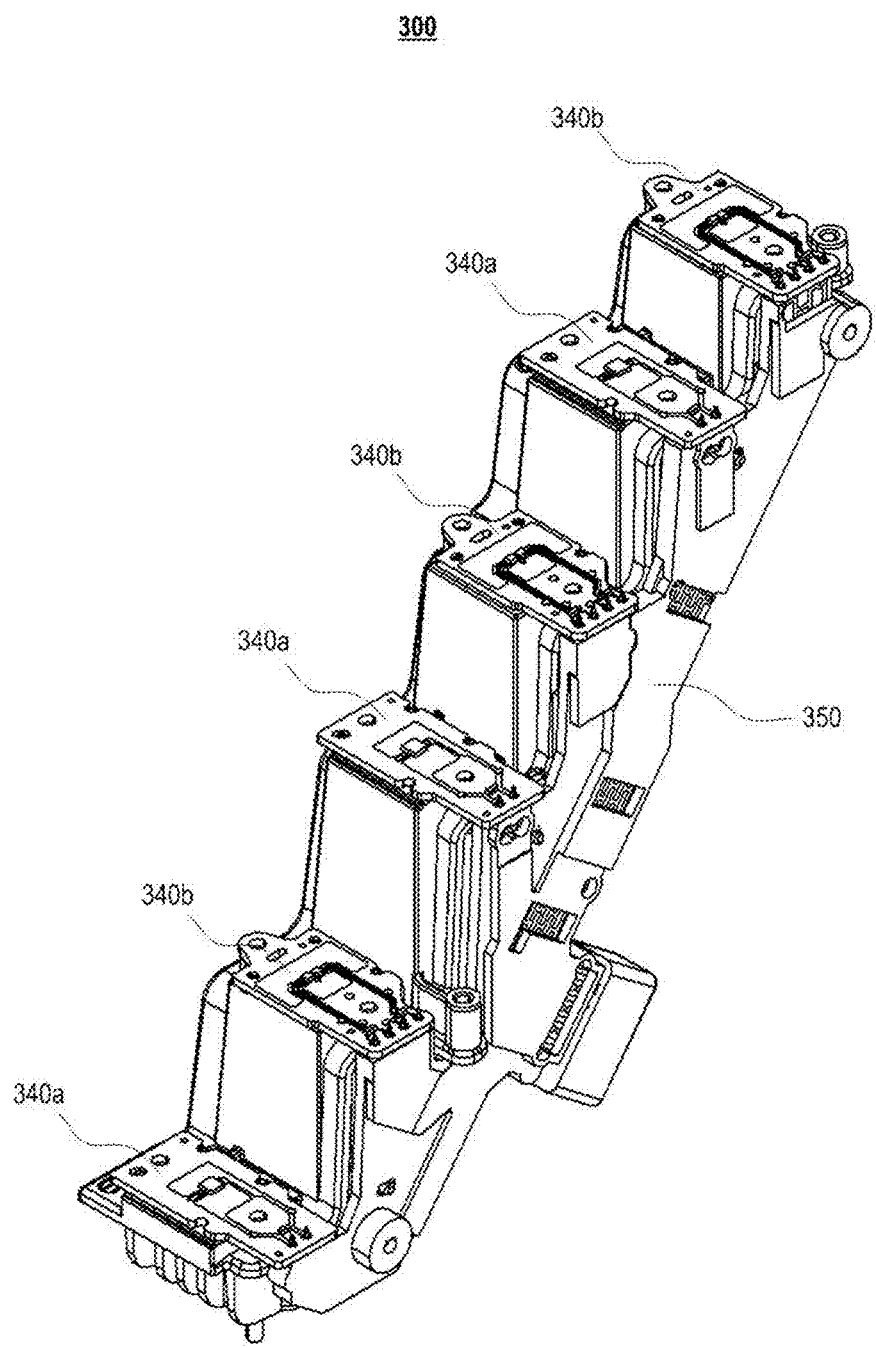
FIGS. 18A and 18B are perspective views showing a vehicle lamp according to yet another exemplary embodiment of the present disclosure.

Hereinafter, yet another exemplary embodiment will be described using an additional interconnection process instead of connectors arranged on the board. FIG. 18A is a perspective view showing a vehicle lamp 300 according to the yet another exemplary embodiment of the present disclosure. In FIG. 18A, for illustration purposes, the light irradiation units 60a, 60b are omitted except for the boards 340a, 340b.

Figure 18B:
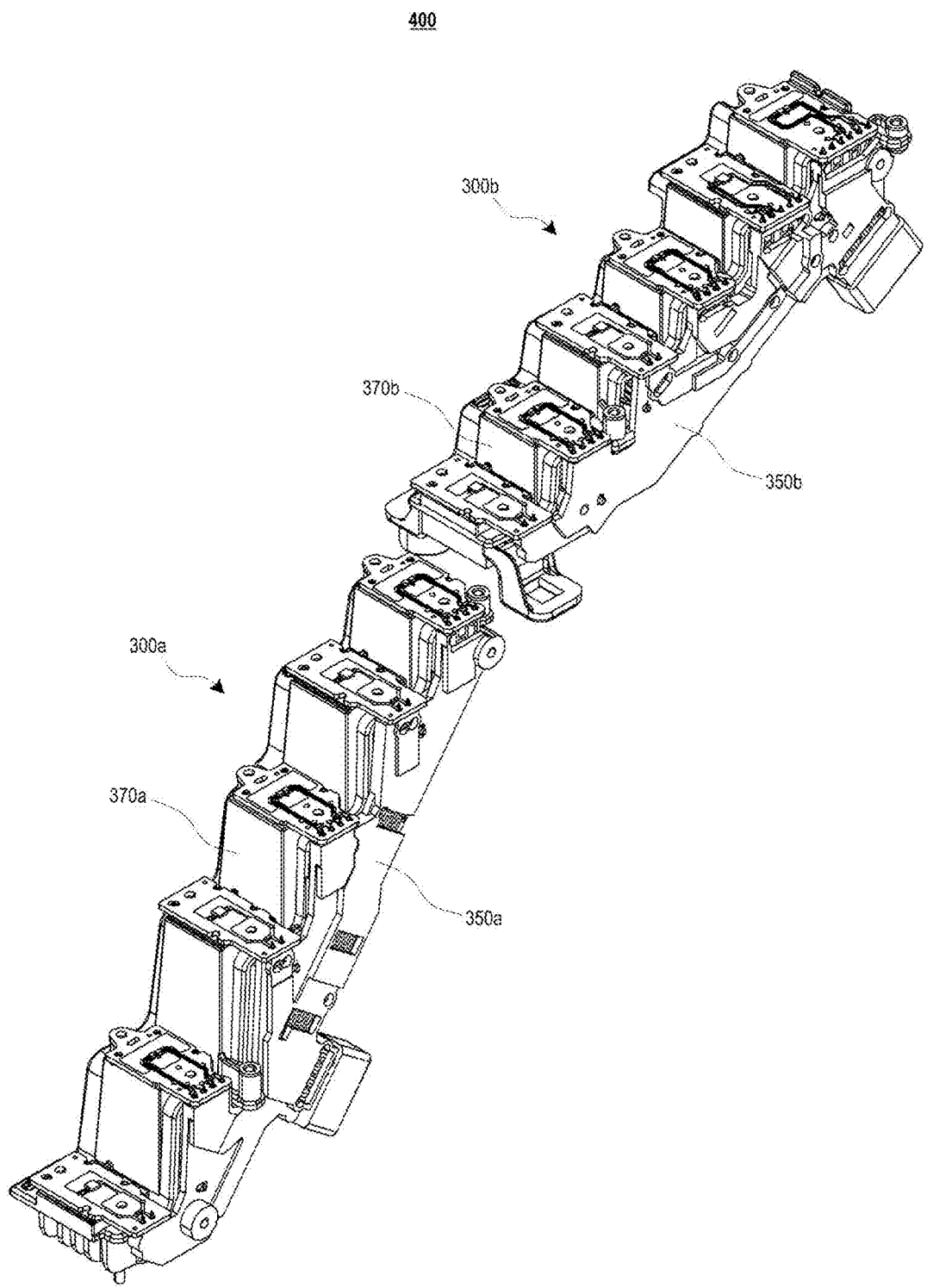
Figure 19:
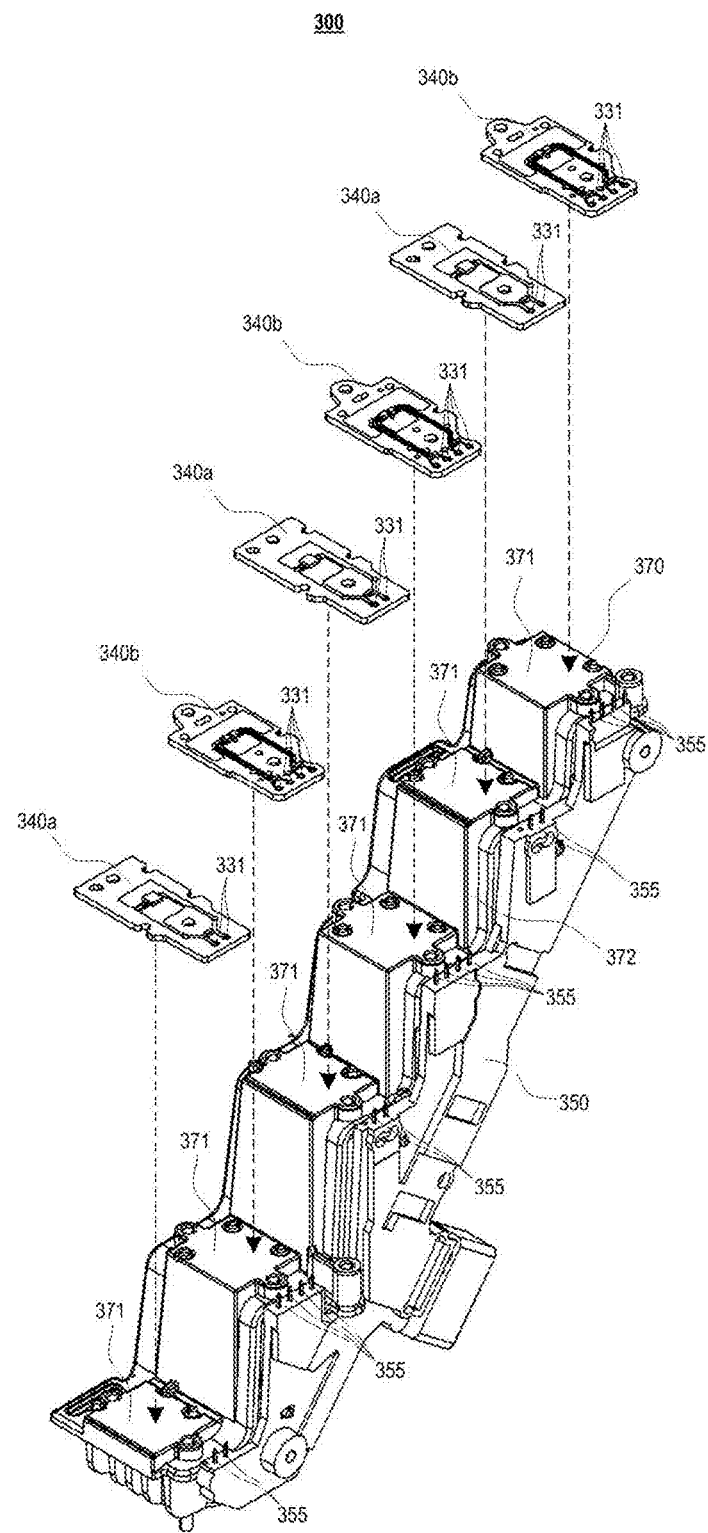
FIG. 19 is a view showing a process of assembling the vehicle lamp 300 of FIG. 18A according to the yet another exemplary embodiment of the present disclosure.

Referring to FIGS. 18A, 18B, and 19, the vehicle lamp 300 may include a base member 370, at least one light irradiation unit (not illustrated in FIGS. 18A, 18B, and 19) mounted on a mounting surface of the base member 370, and a pin block 350 installed on an adjacent side surface while forming a predetermined angle with the mounting surface.

In the vehicle lamp 300, the light irradiation units may be mounted on the mounting surface (e.g., first surface) of the base member 370, and the pin block 350 may be installed on a side surface (e.g., second surface) adjacent to the first surface. In particular, boards 340a and 340b included in the light irradiation units may each include a light source and may be fixed to the mounting surface by a coupling means such as bolts. Accordingly, the boards 340a and 340b and the pin block 350 may be arranged at the same angle (e.g., 90°) as an angle formed by the mounting surface and the side surface of the base member 370.

Further, in FIG. 18A, a single base member 370 and a single pin block 350 are shown. However, the present disclosure is not limited to the exemplary embodiment shown in FIG. 18A, and a plurality of base members 370a and 370b and a plurality of pin blocks 350a and 350b may be included to accommodate a required number of light irradiation units for a vehicle lamp 400, as illustrated in FIG. 18B. For the sake of brevity, some exemplary embodiments will be described according to an example illustrated in FIG. 18A.

FIG. 19 is a view showing a process of assembling the vehicle lamp 300 of FIG. 18A according to the yet another exemplary embodiment of the present disclosure. First, the base member 370 may be prepared, in which the base member 370 includes the mounting surface (e.g., first surface) 371 and the side surface 372 adjacent to the mounting surface 371 while forming a predetermined angle (e.g., 90°) with the mounting surface 371. A fastening groove may be formed on the mounting surface 371 and the side surface 372 to enable fastening by a fastening means such as a bolt or screw.

Subsequently, the pin block 350, which accommodates the connection terminal 355 with at least a part of the connection terminal 355 being extended outwardly, may be mounted on the side surface 372. The connection terminal 355 may protrude from the pin block 350 in a predetermined direction. The predetermined direction, for example, may be an upward direction as shown in FIG. 19.

Next, the board 340a and 340b having an aperture 331 that is electrically connected to the light source may be mounted on the mounting surface 371. Since a rear surface of the board 340a and 340b is in close contact with the base member 370, heat generated from the light source may be transferred to the base member 370 and radiated to the outside.

According to the present disclosure, the connection terminals 355 may be inserted into the corresponding apertures 331 concurrently when the board 340 is mounted on the first surface 371 of the base member 370. After this insertion process, the connection terminals and the corresponding apertures may be fixedly connected. Further, the connection terminals and the corresponding apertures may be fixedly connected to allow electrical connection is established between the connection terminals and the light source through the apertures. Accordingly, the connection terminals and the corresponding apertures may be connected by means of soldering performed during an interconnection process via a robot-soldering or the like. The soldering may refer to a type of interconnection process where two same or different materials are interconnected at an elevated temperature by an intervening metal having a relatively low melting point. Through this process, both mechanical and electrical connection between the two different materials may be established and/or enhanced, and other advantages such as prevention of contamination by foreign substance, prevention of rust, and the like may be provided as well. For example, a robot-soldering may be applied among various interconnection processes. The robot-soldering may decrease defects during a process of interconnecting parts on a board and may enable a more consistent process without human intervention.

Lastly, optic members (e.g., a lens, a reflector, a bracket and a housing, etc.) other than the board 340 among the parts of the light irradiation units may be assembled on the board 340 that is mounted on the base member 370.

Figure 20A:
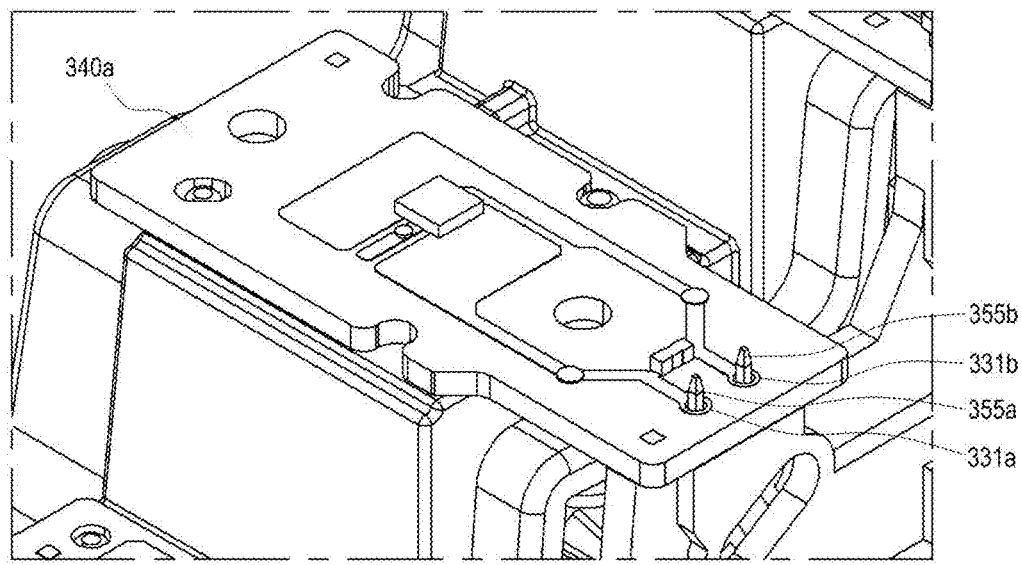
FIGS. 20A and 20B are enlarged perspective views showing a combined form of through holes and connection terminals according to the exemplary embodiment of the present disclosure.
Figure 20B:
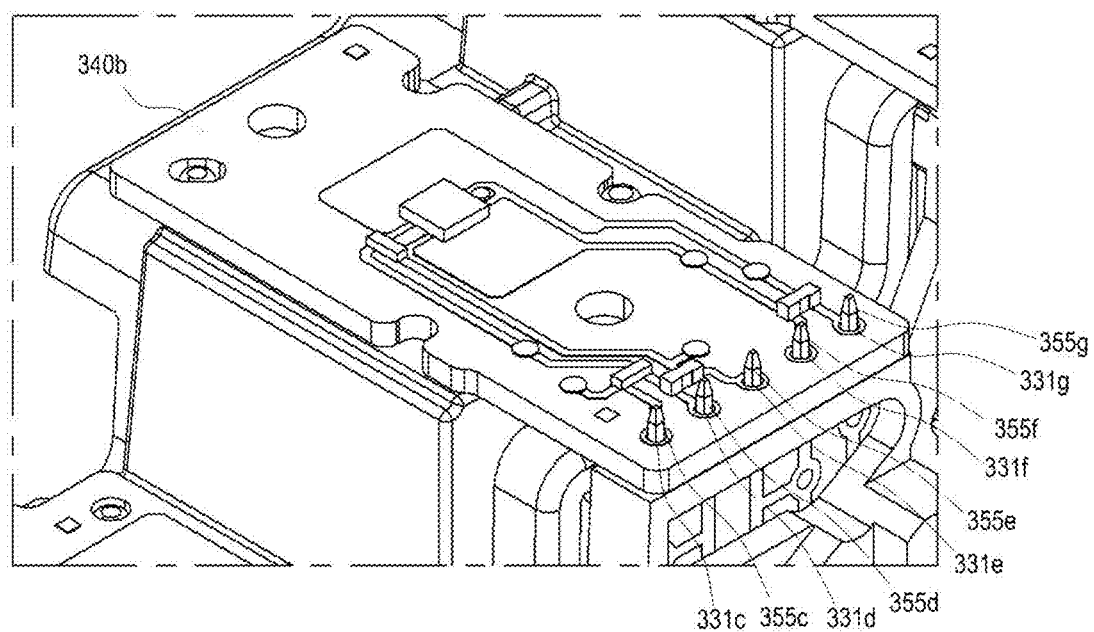

FIGS. 20A and 20B are enlarged perspective views showing a combined form of apertures 331 (331a to 331g) and connection terminals 355 (355a to 355g) according to the exemplary embodiment of the present disclosure. Here, the number of the connection terminals 355 and the corresponding apertures 331 may be varied based on types of light irradiation units mounted on boards 340a and 340b. For example, as illustrated in FIG. 20A, where the pin block 350 has two connection terminals 355a and 355b, the board 340a may include two or more apertures 331a and 331b. On the other hand, as illustrated in FIG. 20B, where the pin block 350 has five connection terminals 355c and 355g, the board 340b may include five or more apertures 331c and 331g.

As such, the connection terminals 355a to 355g may extend and protrude from the pin block 350 and may be insert into the apertures 331a to 331g while forming a predetermined angle (approximately 90°) with a direction in which the boards 340a and 340b. Thereafter, the connection terminals 355a to 355g and the corresponding apertures 331a to 331g may be fixedly connected by means of an interconnection process such as a robot-soldering.

Hereinabove, a first exemplary embodiment was described referring to FIGS. 8 and 9, in which connectors 30 and 39 are coupled with connection terminals 55 of the pin block 50, and a second exemplary embodiment was described referring to FIGS. 20A and 20B, in which connection terminals 355 of the pin block 350 are inserted into apertures 331 and then soldering processes are applied between the apertures 331 and the connection terminals 355. Throughout the present disclosure including the above exemplary embodiments, components formed on the boards 40 and 340 to allow the boards 40 and 340 to be coupled with the connection terminals 55 and 355 may be referred to as "coupling members." In view thereof, the coupling members according to the first exemplary embodiment may be construed to include the connectors 30 and 39, and the coupling members according to the second exemplary embodiment may be construed to include apertures 331 of the board 340 and solders formed around the apertures 331 by a soldering process.

Many modifications and other embodiments of the disclosure will come to the mind of one skilled in the art having the benefit of the teachings presented in the foregoing descriptions and the associated drawings. Therefore, it should be understood that the disclosure is not to be limited to the specific exemplary embodiments disclosed, and that modifications and embodiments are intended to be included within the scope of the appended claims.

What is claimed is:

1. A vehicle lamp comprising:
a light irradiation unit including a light source and a board on which the light source is installed;
a base member including a first surface for mounting the light irradiation unit and a second surface adjacent to the first surface;
a pin block separately provided from the base member and mounted on the second surface of the base member;
a connection terminal included in the pin block, wherein the connection terminal extends and protrudes in a direction of the first surface; and
a coupling member arranged on the board and electrically connected with the light source,
wherein the connection terminal is inserted into the coupling member when the board is mounted on the first surface, and the entire electrical connection for the light irradiation unit is made via the connection terminal of the pin block and the coupling member of the board, and
wherein a plurality of light irradiation units are provided, each having the light source and the board, and wherein the connection terminal comprises a plurality of connection terminal groups corresponding to the plurality of light irradiation units.

2. The vehicle lamp of claim 1, wherein the coupling member comprises:
an aperture that penetrates through the board; and
a solder that fixedly couples the aperture and the connection terminal that is inserted into the aperture.

3. The vehicle lamp of claim 1, wherein the coupling member comprises a connector arranged on the board while forming a predetermined angle with a direction in which the connection terminal protrudes, and
wherein the connector includes a connection port formed to be opened in a rear direction of the board to allow the connection terminal to be inserted thereinto when the board is mounted on the first surface.

4. The vehicle lamp of claim 1,
wherein the pin block accommodates the plurality of connection terminal groups and mounted on the second surface of the base member, and
wherein at least a portion of each of the plurality of connection terminal groups extends and protrudes from the pin block toward the first surface of the base member.

5. The vehicle lamp of claim 4, wherein the pin block comprises:
the plurality of connection terminal groups;
a body accommodating a connection that extends from the connection terminal groups; and a connection socket formed on one side of the body and electrically connected to the connection.

6. The vehicle lamp of claim 4, wherein the first surface comprises a plurality of mounting surfaces corresponding to the plurality of connection terminal groups,
wherein the plurality of mounting surfaces have steps between adjacent mounting surfaces, and
wherein the plurality of light irradiation units are mounted on the plurality of mounting surfaces.

7. The vehicle lamp of claim 6, wherein a height of each of the plurality of connection terminal groups is determined depending on a corresponding mounting surface among the plurality of mounting surfaces.

8. The vehicle lamp of claim 6, wherein at least two of the steps have different heights from each other.

9. A method for assembling a vehicle lamp, comprising:
providing a base member including a first surface and a second surface adjacent to the first surface;
mounting a pin block on the second surface, wherein the pin block includes a plurality of connection terminal groups, and at least a portion of each of the plurality of connection terminal groups extends and protrudes outwardly from the pin block in a direction of the first surface; and
mounting a plurality of boards to the first surface of the base member, wherein each of the plurality of boards comprises a light source and a coupling member that is electrically connected to the light source,
wherein, during the mounting of the each of the plurality of boards on the first surface of the base member, a corresponding connection terminal group among the plurality of connection terminal groups is simultaneously inserted into the coupling member.

10. The method of claim 9, wherein the coupling member comprises an aperture that penetrates through the board, and
wherein the corresponding connection terminal group among the plurality of connection terminal groups is inserted into the aperture, and a solder is formed between the corresponding connection terminal group and the aperture.

11. The method of claim 9, further comprising:
mounting a lens that transmits light emitted from the light source and a housing that accommodates the lens to each of the plurality of boards.

12. The method of claim 9, wherein the first surface comprises a plurality of mounting surfaces corresponding to the plurality of connection terminal groups,
wherein the plurality of mounting surfaces have steps between adjacent mounting surfaces, and
wherein the plurality of light irradiation units are mounted on the plurality of mounting surfaces.

13. A vehicle lamp comprising:
a plurality of light irradiation units including a light source and a board on which the light source is installed;
a base member for mounting the plurality of light irradiation units;
a pin block including a connection socket and a plurality of wirings, wherein a first end of the plurality of wirings is connected to the plurality of light irradiation units and a second end of the plurality of wirings is connected to the connection socket, and wherein the pin block is arranged on one side of the base member; and
a plug including a cable that connects the connection socket to an external device and a return wiring for electrically connecting at least one pair of wirings among the plurality of wirings to each other, the plug being detachably coupled with the connection socket,
wherein the one pair of wirings is electrically disconnected when the plug is disconnected from the connection socket, and is electrically connected through the return wiring when the plug is coupled to the connection socket.

14. The vehicle lamp of claim 13, wherein the plurality of light irradiation units comprise a first light irradiation unit having a first function, and a second light irradiation unit having a second function different from the first function, and
wherein the plurality of wirings comprise a first wiring array arranged on a first layer of the pin block, and a second wiring array arranged on a second layer of the pin block different from the first layer.

15. The vehicle lamp of claim 14, wherein the first light irradiation unit and the second light irradiation unit are mounted to the base member adjacent to each other.

16. The vehicle lamp of claim 14, wherein the first light irradiation unit irradiates a headlight, and
wherein the second light irradiation unit irradiates at least one of a daytime running light (DRL), a position light, or a turn signal.

17. The vehicle lamp of claim 13, wherein one of the at least one pair of wirings connected by the return wiring is connected to a terminal formed in a first position of one light irradiation unit among the plurality of light irradiation units, and to a terminal formed in a second position of another light irradiation unit having a same function with the one light irradiation unit among the plurality of light irradiation units.

18. The vehicle lamp of claim 17, wherein the terminal formed in the first position is a negative terminal that supplies power for the function, and the terminal formed in the second position is a positive terminal that supplies power for the function.

19. The vehicle lamp of claim 13, wherein the pin block further includes an internal wiring that internally connects two light irradiation units among the plurality of light irradiation units without extension to the connection socket.

* * * * *